(12) United States Patent
Kawamoto et al.

(10) Patent No.: US 7,606,871 B2
(45) Date of Patent: Oct. 20, 2009

(54) SYSTEM AND METHOD FOR VIRTUALIZING NETWORK STORAGES INTO A SINGLE FILE SYSTEM VIEW

(75) Inventors: Shinichi Kawamoto, Hachioji (JP); Atsushi Ebata, Kokubunji (JP); Jun Okitsu, Kokubunji (JP); Yoshiko Yasuda, Tokorozawa (JP); Tatsuo Higuchi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 494 days.

(21) Appl. No.: 10/335,853

(22) Filed: Jan. 3, 2003

(65) Prior Publication Data
US 2003/0220985 A1    Nov. 27, 2003

(30) Foreign Application Priority Data
May 24, 2002   (JP)   ............................. 2002-149977

(51) Int. Cl.
 *G06F 15/16* (2006.01)
(52) U.S. Cl. ................... 709/217; 709/223; 709/224; 709/225; 709/226; 707/201; 707/205
(58) Field of Classification Search ......... 709/201–203, 709/223–226; 707/10, 100, 201–205
See application file for complete search history.

(56) References Cited

U.S. PATENT DOCUMENTS

| | | | | |
|---|---|---|---|---|
| 5,745,888 A | * | 4/1998 | Bauer et al. .................. 707/1 |
| 6,029,168 A | | 2/2000 | Frey | |
| 6,035,373 A | * | 3/2000 | Iwata ........................ 711/114 |
| 6,101,508 A | * | 8/2000 | Wolff ........................ 709/223 |
| 6,195,650 B1 | * | 2/2001 | Gaither et al. ................ 707/10 |
| 6,330,572 B1 | * | 12/2001 | Sitka ........................ 707/205 |
| 6,601,070 B2 | * | 7/2003 | Zhang et al. ................. 707/10 |

(Continued)

OTHER PUBLICATIONS

Rusling, David A., "The VFS Cache," http://sunsite.nus.sg/LDP/LDP/tlk/node110.html, 1999.*

(Continued)

*Primary Examiner*—Dohm Chankong
(74) *Attorney, Agent, or Firm*—Reed Smith LLP; Juan Carlos A. Marquez, Esq.

(57) ABSTRACT

A virtualizing file system view method for virtualizing one or more network storage devices into a virtualized file system view network storage system wherein destination network storage information of stored files is compactly held regardless of the number of files, and files are separated into one or more file groups and the file groups managed in destination network storage units. Until now, managing network storage unit information in individual files was necessary however the virtualizing file system view method reduces the management information that must be held and efficiently utilizes network storage capacity without holding destination network storage information in individual files. The cost of rewriting information is also lowered during structural changes such as adding or deleting network storage units since storage destination network information can be rewritten in file groups.

7 Claims, 17 Drawing Sheets

U.S. PATENT DOCUMENTS

| | | | |
|---|---|---|---|
| 6,640,278 B1 * | 10/2003 | Nolan et al. | 709/223 |
| 6,745,207 B2 * | 6/2004 | Reuter et al. | 707/100 |
| 6,782,389 B1 * | 8/2004 | Chrin et al. | 707/10 |
| 6,807,632 B1 * | 10/2004 | Carpentier et al. | 713/165 |
| 6,898,670 B2 | 5/2005 | Nahum | |
| 6,907,457 B2 * | 6/2005 | Merrell et al. | 709/223 |
| 6,912,537 B2 | 6/2005 | Selkirk et al. | |
| 6,959,313 B2 * | 10/2005 | Kapoor et al. | 707/205 |
| 6,971,044 B2 * | 11/2005 | Geng et al. | 709/226 |
| 6,990,667 B2 * | 1/2006 | Ulrich et al. | 709/226 |
| 7,010,655 B1 * | 3/2006 | Harmer et al. | 707/205 |
| 7,082,441 B1 * | 7/2006 | Zahavi et al. | 707/200 |
| 7,124,133 B2 * | 10/2006 | Yamauchi et al. | 707/10 |
| 7,136,883 B2 * | 11/2006 | Flamma et al. | 707/204 |
| 2001/0039548 A1 * | 11/2001 | Shinkai et al. | 707/201 |
| 2002/0004883 A1 | 1/2002 | Nguyen et al. | |
| 2002/0103889 A1 | 8/2002 | Markson et al. | |
| 2003/0084241 A1 | 5/2003 | Lubbers et al. | |

OTHER PUBLICATIONS

John H. Hartman et al., "The Zebra Striped Network File System", Computer Science Division, electrical Engineering and Computer Sciences, University of California, 15 pages.

"OTG DiskXtender 2000 with Maxtor MaxAttachTM", Network Attached Storage Solutions, Technical Spotlight, Feb. 2002, 2 pages.

John H. Hartman and John K. Ousterhout, "The Zebra Striped Network File System", Computer Science Division, Electrical Engineering and Computer Sciences of University of California, 14 pages, 1995.

Christos Karamanolis, Mallik Mahalingam, Dan Muntz and Zheng Zhang, "DiFFS: A Scalable Distributed File System", HP Laboratories (Jan. 24, 2001), Hewlett-Packard Company, 7 pages.

* cited by examiner

FILE GROUP ALLOCATION TABLE       120

| 1201 | 0 | 1 | 2 | 3 | 4 | 5 | 6 | 7 | 8 |
|------|---|---|---|---|---|---|---|---|---|
| 1202 | 1 | 1 | 1 | 2 | 2 | 2 | 3 | 3 | 3 |

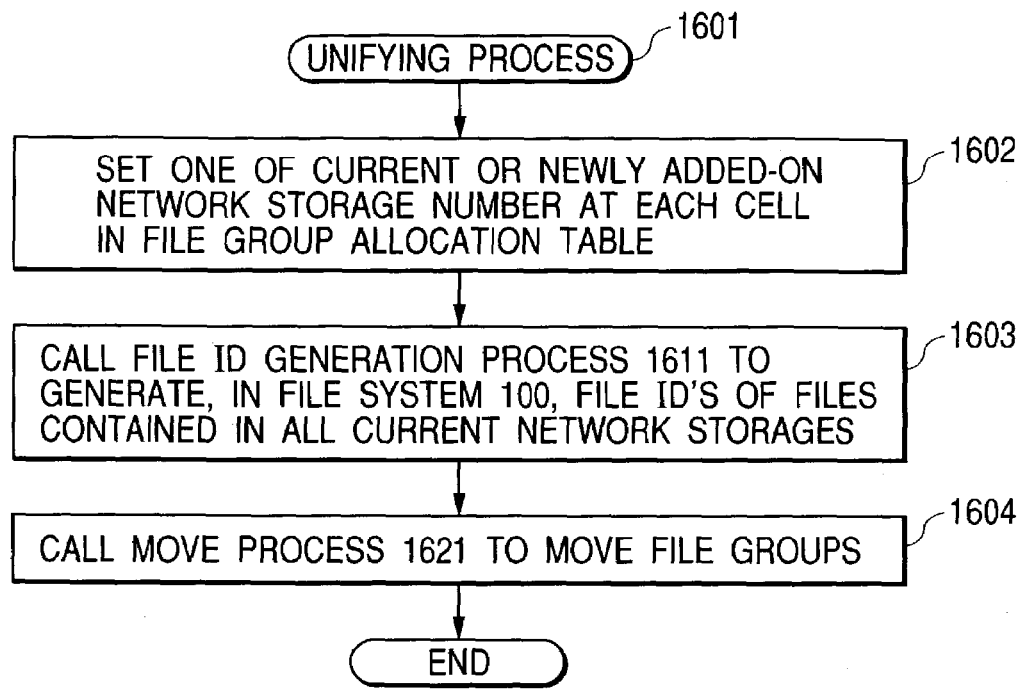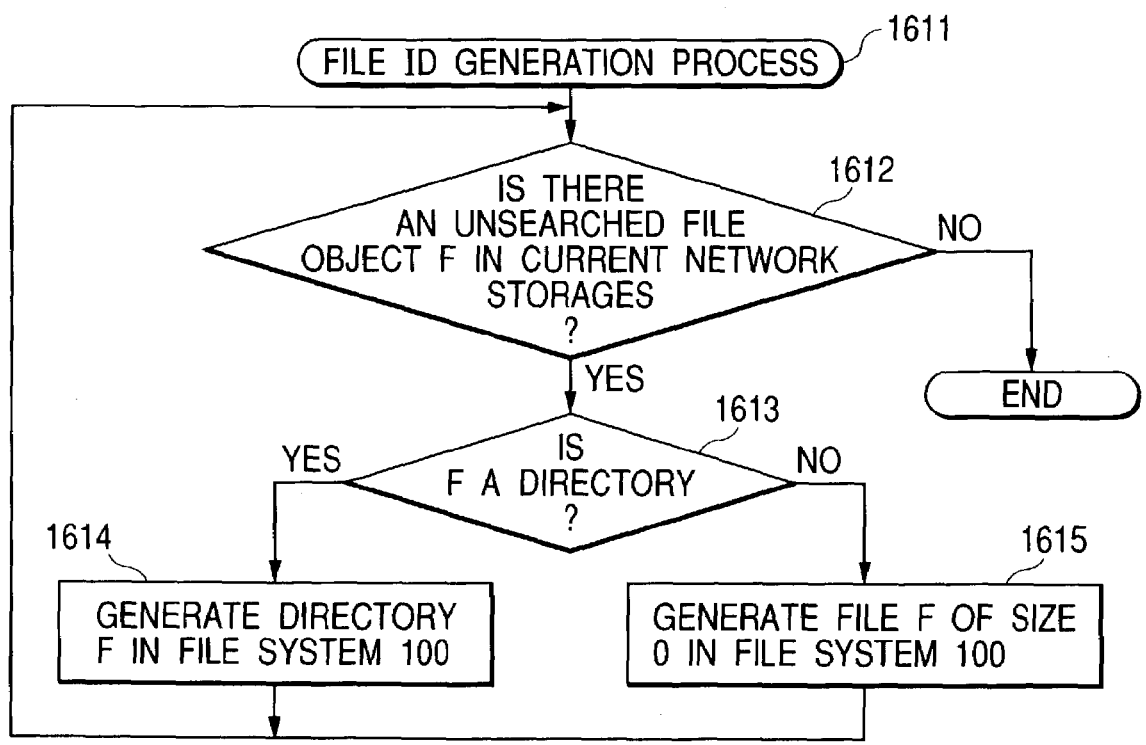

SYSTEM AND METHOD FOR VIRTUALIZING NETWORK STORAGES INTO A SINGLE FILE SYSTEM VIEW

CROSS-REFERENCE TO RELATED APPLICATION

This application is related to a U.S. patent application Ser. No. 10/219,770 filed Aug. 16, 2002, entitled "System and Method for Virtualizing A Distributed Network Storage as A Single-View File System", the disclosure of which is hereby incorporated by reference.

BACKGROUND OF THE INVENTION

1. Field of the Invention

The present invention relates to a network storage virtualizing method and a virtualizing device for viewing multiple network storage devices as one network storage device from the client.

2. Description of Related Art

Information systems of the related art utilize local connections for storing information in computers for processing. However, along with the advance made in network technology in recent years, rather than placing information for storage in computers, the practice of connecting to a network and storing information by accessing a network has become widespread. Storing information by connecting to a network is referred to as network storage.

Typical examples of network storage are the SAN storage and NAS (Network Attached Storage). The SAN storage uses SAN (Storage Area Network) and has high reliability and performance. However the cost of SAN storage is extremely high and is mainly used by business enterprises. The NAS on the other hand uses the IP network which is the most widespread. The performance NAS delivers is lower than SAN storage but the cost is low compared to SAN and it is also easier to use.

In recent years, instead of high-priced large scale methods, demands have been made to obtain performance and capacity by using multiple small-scale NAS units. However, this method has the problem that when the number of NAS units is increased, the cost for managing those units also greatly increases. Whereupon, even if multiple NAS are made to appear as one virtual NAS (unit) from a computer and new NAS are added and current (existing) NAS eliminated in an effort to limit system management costs, NAS virtualizing (single-file) technology that does not adversely affect the computer is still needed.

A number of methods have been developed for NAS virtualizing (single-file) technology of this kind. A method is disclosed in http://www.maxtor.com/products/maxattach/default.htm for example, wherein a control server called a primary storage (unit) that also functions as a network storage unit manages the file positioning information in one batch. In this method, multiple network storage units determined by attributes of the storage unit such as the time the file is accessed, are made to appear as one virtual network storage unit. Newly generated files are stored in primary storage and files not accessed for a certain period of time are then shifted to secondary storage. When the primary storage receives a request from a computer to access a file, and that file currently resides in secondary storage; that file is accessed (while) in secondary storage so that only one network storage unit is viewed as seen from the computer.

In another method disclosed in, The Zebra Striped Network File System, Hartman et. al., ACM Transactions on Computer System, vol. 13, No. 3, 1995, pp. 274-310, a file is divided into file fragments and they are distributed among multiple network storage units. A centralized control server is installed to monitor in what sequence and what storage unit the file is stored in, so that multiple network storage units are virtually shown as one network storage unit. By using this striping method on one file in network storage areas, even when the disk size of the file is extremely large, data can be uniformly written into each network storage unit.

Another method was disclosed, DiFFS: A Scalable Distributed File System, Christos Karamanolis et. al., HP Laboratories Palo Alto, HPL-2001-19, Jan. 24, 2001 wherein, in contrast to the above mentioned centralized server method, a de-centralized server method is utilized to show multiple network storage units virtually as on network storage unit. In this method, the destination network storage unit of the file is stored within a directory entry that controls the directory and files, and this directory entry is dispersed and stored in network storage units.

Technology disclosed in U.S. Pat. No. 6,029,168 describes the above non-centralized server method along with a method for dividing upon file into file fragments and distributing them among multiple network storage units. In this method, each network storage unit has small information of file fragments and its locations.

The above methods; http://www.maxtor.com/products/maxattach/default.htm and DIFFS: A Scalable Distributed File System differed in that file management information was held by a centralized means or a dicentralized means, however information on each file was held as destination network storage information. The above Zebra Striped Network File system method and the method in U.S. Pat. No. 6,029,168 also held fragments (pieces) of the file as destination network storage information. When an individual file or file fragments are held in this way as destination network storage information, the management information greatly expands in proportion to the number of files, and this management information places a strain on the data storage area of the network storage unit.

Further, during structural changes such as when the destination network storage (unit) for the file is changed at times such as when new network storage is added or deleted from the multiple network storage units virtualized into one view; the destination network storage (unit) information must be rewritten for all files at the storage destination that were changed. This task of rewriting information has effects on performance when these structural changes are made.

SUMMARY OF THE INVENTION

In view of the above problems with the related art, the present invention has the object of providing a method for virtualizing multiple network storage units into a singl network storage system for making management information for the file storage destination more compact and that does not place a strain on the data storage area. Another object of the present invention is to provide a method for virtualizing multiple network storage units into a single network storage system that reduces the overhead of the task of rewriting management information during file transfer caused by structural changes in network storage, and that permits fast and flexible structural changes.

One aspect of the system for virtualizing multiple network storage units into a single network storage system of present invention is characterized in that destination network storage units for files are managed in file groups. A file group that a file belongs to is defined in advance on a group map. The group map for example, applies a hash function to the file identifier as a search or indexing key. A group allocation table (or file group allocation table) is also provided for establishing the file group and destination network storage (unit) of the file belonging to that file group. The group allocation table for example, is a table and database for recording how the file group corresponds to the network storage unit. When the client accesses a file, the file group that file to be accessed belongs to, is first of all found from the group map and the identifier of that file. The network storage (unit) corresponding to the file group found by referring to the group allocation table is next found. This network storage. unit that was found is the destination network storage unit where the file to be accessed is located so that file is now accessed. The system and method of the present invention hold destination network storage information in file groups comprised of one more files so there is less information to be managed than when managing information by individual files.

Also, when changing the structure of the virtualizing network storage system of the invention, the destination network storage units of the file are moved as file groups. In this case, only the destination network storage unit for the file group whose group allocation has been changed are moved so the process overhead is smaller than when managing destination storage information as individual files.

BRIEF DESCRIPTION OF THE DRAWINGS

FIG. 16 is a flow chart showing the process flow of the method for unifying the existing network storage devices;

FIG. 17 is a flow chart showing the process flow of the method for generating file identifiers when unifying the existing network storage devices;

DETAILED DESCRIPTION OF THE PREFERRED EMBODIMENTS

First Embodiment

Figure 1:
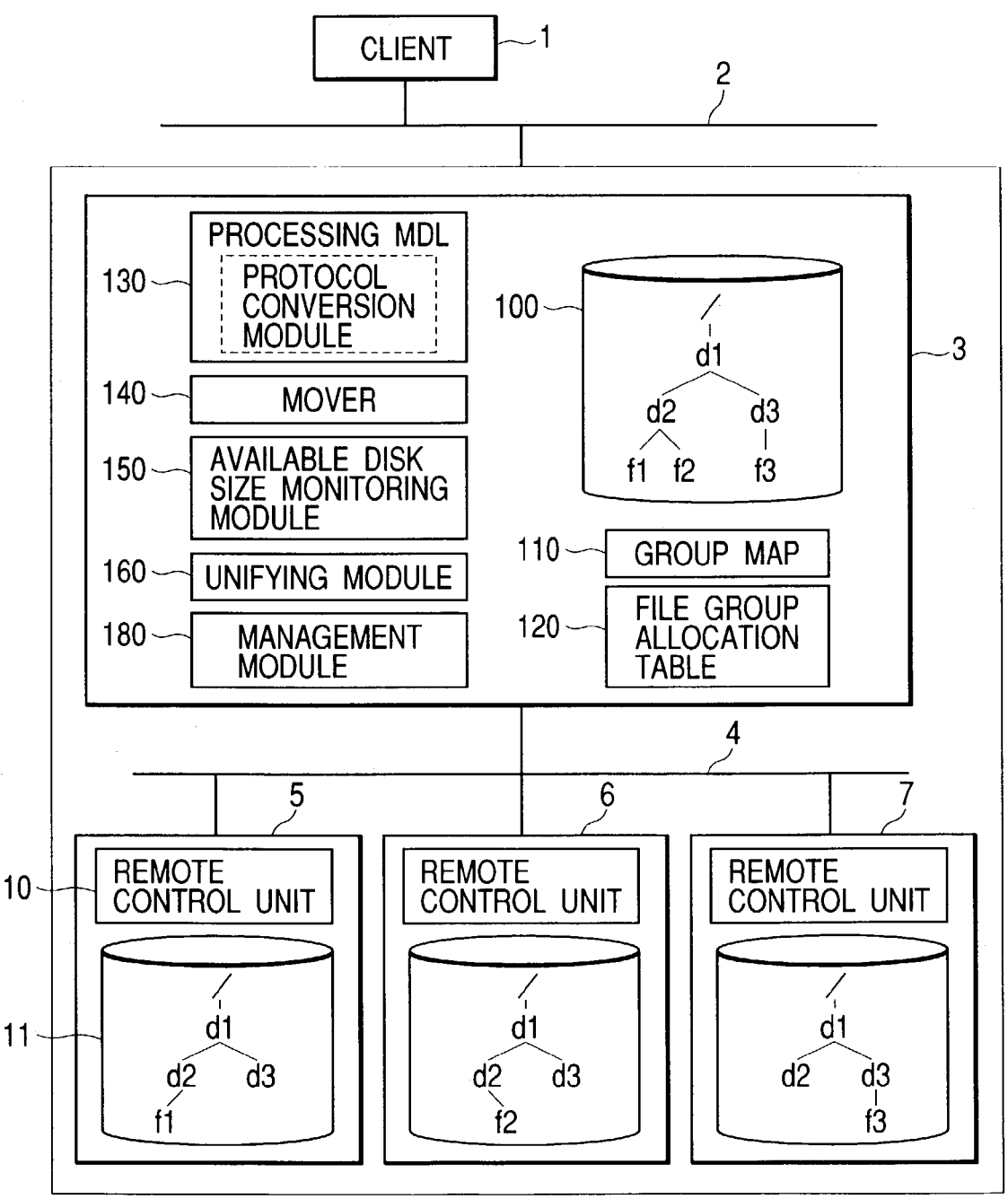
FIG. 1 is a block diagram showing the structure of the network storage device for the virtualizing network storage system with file system of the present invention.

FIG. 1 is a block diagram showing the overall structure of the information system of the first embodiment of the present invention. A client 1 is connected through a network 2 to the virtualizing device 3 of the present invention. The virtualizing device 3 is connected through a network 4 to the network storage units 5, 6, 7. The network storage units 5, 6, 7 may be connected to the network 2 instead of the network 4. High performance can be obtained during centralized access by separating the network 2 and the network 4. On the other hand, connecting the network storage units 5, 6, 7 to the network 2 makes the network 4 unnecessary and lowers the cost. The virtualizing device 3 makes the network storage units 5, 6, 7 appear as a virtualized network storage system and provides a network storage accessible from a client 1.

(Network Storage)

The network storage units 5, 6, 7 are configured with technology of the known art and contain a remote control unit 10 and a storage unit 11. The storage unit 11 contains a file system. A dedicated device may be utilized for the network storage units 5, 6, 7 and may be general server, work station comprising a storage device or contain a remote control unit in a PC. The remote control unit 10 receives mount requests and file generation, reading, writing or directory generation requests from the client connected to the network and performs file generation, reading, writing or directory generation in the file system of the local storage device. The remote control unit 10 communicates with the client using file access protocol systems for example, the NFS (Network File System) developed by Sun Microsystems, Inc. and the CIFS (Common Internet File System) developed by the Microsoft Corporation. The file access protocol used in the first embodiment is NFS. The remote control unit 10 receives requests from NFS and uses mountd and nfsd of the known art for file access processing.

(Virtualizing Device)

The virtualizing device 3 of this embodiment is comprised of a file system 100, a group map 110, a file group allocation table 120, a processor (request processing means) 130, a mover (movement means) 140, an available disk size monitoring module 150, a unifying module 160 and a management module 180. The file system 100, the group map 110 and the file group allocation table 120 are mainly utilized to determine the destination network storage (unit) of the file. A description is given later on in the (file system) (group map) (file group allocation table) items. The processor (request processing means) 130 processes file access requests from the client. A description is given later on in the (processor) item. The mover (movement means) 140 adds or deletes network storage units or moves files among network storage units when the available disk size (capacity) has fallen below a predetermined value. A description is given later on in the (mover) item. The available disk size-monitoring module 150 constantly monitors the disk size (capacity) of each network storage unit and starts the mover (movement means) if necessary. A description is given later on in the (disk monitoring module) item. The unifying module 160 performs processing for integrating the virtualizing network storage system with existing network storage devices already in operation. A description is given later on in the (unifying module) item. The management module 180 receives instruction from the administrator controlling the unified virtualizing network storage system 8, changes the settings on the virtualizing device 3, and responds to requests for structural change by calling the mover 140 and the unifying module 160. The administrator accesses the management module 180 through the user interface constituted by the general-purpose Web browser of the client 1. A dedicated user interface program loaded at the client 1 may also be used, or a console connected to the virtualizing device 3 utilized. An overview of the function of the virtualizing device 3 is described next. First of all, the client 1 issues a mount request to the virtualizing device 3, and a directory granted approval for joint used by the unified virtualizing network storage system 8 is mounted in a specified location of the file system of the client 1. When the client 1 then issues a file access request, the processor (request processing means) 130 of the virtualizing device 3 receives that request and uses the file system 100, the group map 110 and the file group allocation table 120 to request the destination network storage unit where the target file for accessing is located. The file access request received from the client is then sent to that destination network storage unit. When the destination network storage unit finished implementing file access of the destination network storage unit, the virtualizing device 3 sends back the data acquired from the destination network storage unit to the client 1 that made the request. In this way, there is no need for the client 1 to know what destination network storage unit the target file for accessing is located, and multiple network storage units can be accessed as one large network storage unit.

The virtualizing device 3 of the present invention, separates the files into file groups, assigns a destination network storage device (or unit) for the file to each file group and stores files belonging to the same file group into the same network storage unit. File groups are established in a number equal to or greater than the number of network storage units 5, 6, 7. When the disk size (capacity) of files belonging to file groups varies greatly between file groups, an unbalanced state might occur among the network storage units storing those file groups. To improve this imbalance, file groups maybe provided in numbers from 10 to 1,000 times greater than the number of network storage units. Taking this measure will decrease variations in the disk size (capacity) between each file group and eliminate the unbalance in usable disk size (capacity) among network storage units. By establishing destination network storage units in file groups in this way, the problem in the related art of management (control) information increasing proportionately to the number of files and placing a strain on network storage is eliminated and there is no need to rewrite destination network storage information of a file when moving files, so that the work overhead can be reduced.

Hereafter, the structure of the virtualizing device 3 is described in detail.

(File System)

The file system manages the directory structure of the overall unified virtualizing network storage system as well as the file identifiers for all files. The file system 100 used by the virtualizing device 3 utilizes the file system provided by the operating system.

Figure 2:
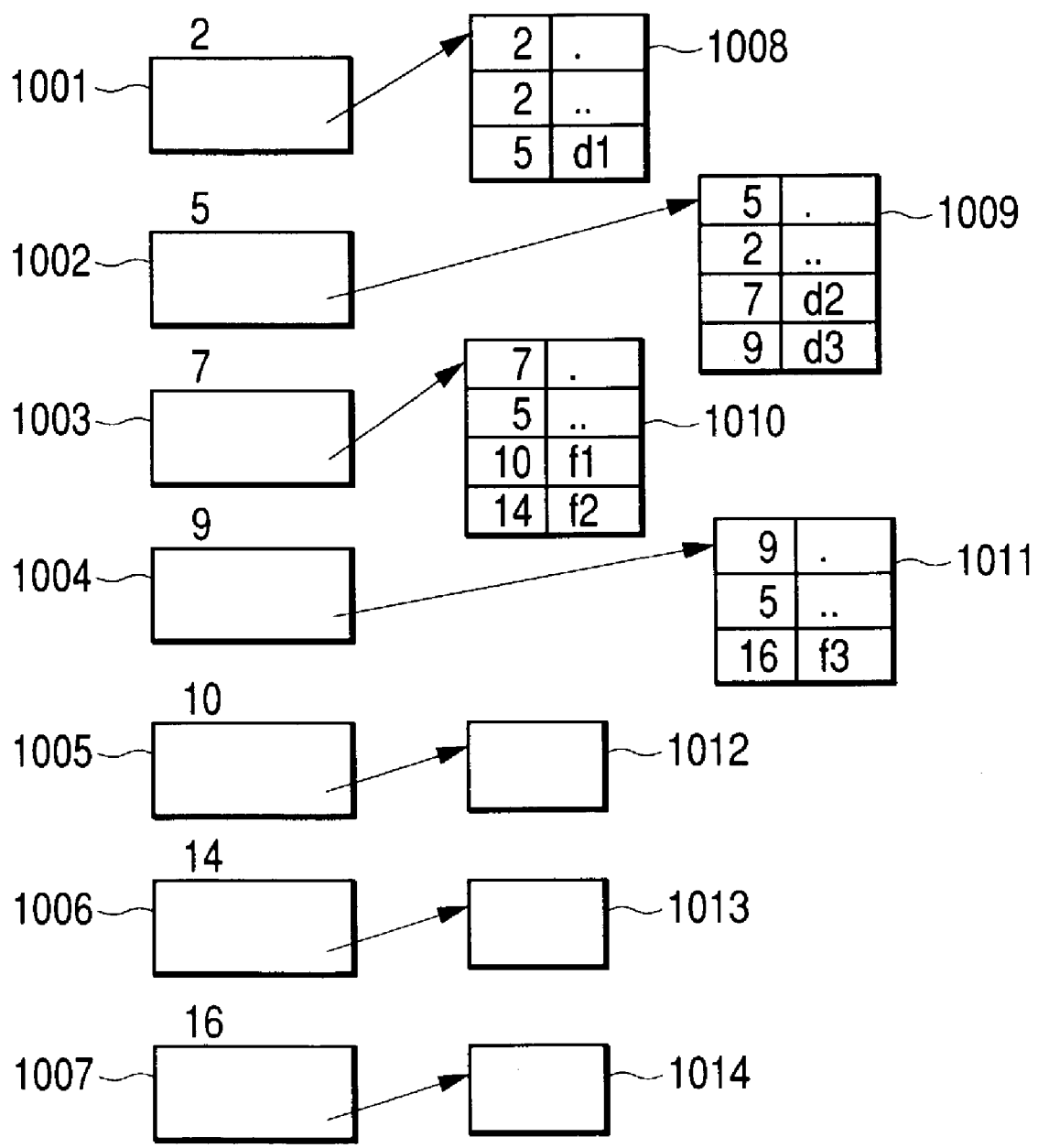
FIG. 2 is a diagram showing the structure of the file system.
Figures 3, 4:
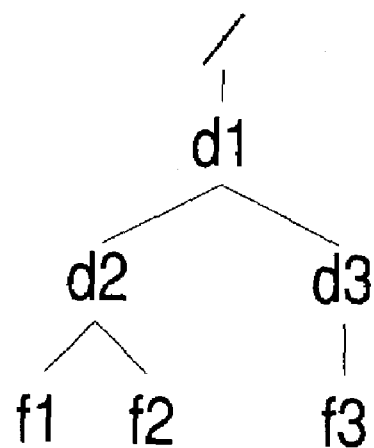
FIG. 3 is a diagram showing an example of the directory structure used for describing the file system structure.
FIG. 4 is a drawing showing an example of the file group allocation table.

FIG. 2 shows the basic structure of a file system for the Solaris operating system of Sun Microsystems, Inc., the AIX operating system of International Business Machines Corporation, the HP-UX and Linux of Hewlett-Packard Company and the UNIX type operating system for FreeBSD, etc. The file system in FIG. 2 shows the storage state of file groups having the directory structure of FIG. 3. The /, d1, d2, d3 in FIG. 3 are directories, and f1, f2, f3 indicate the files. Here, / expresses the start point for the directory called the root.

The file and directory are together referred to as the file object. The file object is recorded inside the file system as a data structure 1001-1007 called the i node. The inodes have a unique identifier called an inode No. to identify that data structure. In the example in FIG. 2, in the / directory, the inode 1001 corresponds to inode No. 2. In directory d1, the inode 1002 corresponds to inode No. 5. In directory d2, the inode 1003 corresponds to inode No. 7. In directory d3, the inode 1004 corresponds to inode No. 9. In file f1, the inode 1005 corresponds to inode No. 10. In file f2, the inode 1006 corresponds to inode No. 14. In file f3, the inode 1007 corresponds to inode No. 16. In the file system, this inode No. is used to identify file objects. However, the directory information for managing the name and allocated location of the file object is managed by structures 1008, 1009, 1010, 1011 called directory entries. One directory entry is established for each respective directory within the file system. The directory entries 1008, 1009, 1010, 1011 respectively correspond to the directories /, d1, d2, d3. The inodes of the directories hold pointers showing the directory entry matching that directory. In the case of FIG. 2 for example, inode 1002 equivalent to directory d1 holds a pointer to directory entry 1009 for directory d1. The elements of the directory entry are a set consisting of an inode No. for its own directory and that directory name (indicating the set), a set consisting of the parent directory inode No., and its directory name (indicating the set), as well as a set consisting of the inode No. for the file or directory immediately under its own directory and that file name or directory name.

The directory structure is managed by a chain of mutual inode and directory entries. For example, the inode 1001 equivalent to the / directory is showing (pointing to) the directory entry 1008. Upon referring to this directory entry, one can see that a file object with the name d1 is present directly under the / directory and that its inode No. is 5. On next referring to the No. 5 inode 1002, one can see that the file object is the directory, and by referring to the directory entry 1009 that No. 5 is pointing to, one can also see that a file object with the name d2 of inode No. 7; and a file object with the name d3 of inode No. 9 are present directly under the directory d1. Further, referring to inode No. 9 of inode 1004 reveals that it is a directory, and then referring to the directory entry 1011 shown by inode 9, one can see that a file object with the name f3 of inode No. 16 is present directly under it. The directory structure can in this way be recorded by the inode and the directory entry. Next, the inodes 1005, 1006, 1007 corresponding to the file records a pointer pointing to the data block storing the data comprising the file contents. In FIG. 2, the inode 1005 corresponding to file F1 is indicating the data block 1012. The file F1 data is stored inside this data block 1012. When a file uses multiple data blocks, the inode records pointers indicating all of those blocks.

The general structure of a file system provided by a UNIX type operating system was described above. A normal file system stores the data for the file itself, as well as the directory structure and identifiers of the file. However the virtualizing device 3 of the present invention uses the file system 100 only for management of the file directory structure and file identifier (hereafter called management information) and stores the data of the file itself in the network storage units, 5, 6, and 7. The virtualizing device 3 therefore generates a dummy file with a disk size (capacity) of 0 for the file system 100. When the client stores file groups having a directory file structure storing file groups as shown in FIG. 3 for the unified virtualizing network storage system 8, the virtualizing device 3 utilizes the structure in the file system 100 of FIG. 2 however it does not use the data blocks 1012, 1013, 1014 which are the file itself.

The virtualizing device 3 utilizes the inode No. as the file identifier.

The ability to manage the directory structure and file identifier does not always render the file system 100 unnecessary. The file identifier ensures a meaning for all files, and may utilize the database for control and a dedicated table may be provided for utilization.

(Group Map)

The group map 110 shows how the file corresponds to the file group to which the file belongs. More specifically, the group map is comprised of an inode No. as the identifier of the file and an identifier for the file group that the file identified by that inode No. belongs to. One specific example of the group map 110 is using the file inode No. I as the search key and a hash value given by the hash function, G=Hash (I) constituting the file group G identifier. When the file for example is segmented into some N file groups, the file group identifier is the value obtained from applying the hash function in the modulo calculation (remainder after dividing by N) of N number of file groups to the inode No. I.

$$G = \text{Hash}(I) = I \mod N$$

The group map hash functions are as follows when there are nine file groups from 0 through 8.

$$\text{Hash}(I) = I \mod 9 \qquad (1)$$

Besides the above described modulo calculation, any method using the hash function may be utilized if capable of establishing a relation between the file group and inode number I. However, if a hash function is used where the number of files belonging to the designated file group is greatly larger than the number of files belonging to other file groups, then an imbalance in disk size (capacity) will occur between the network storage units that store these file groups. To prevent this problem from occurring, a function should be selected that uniformly spreads the files among the file groups.

(File Group Allocation)

The structure of the file group allocation table is shown in FIG. 4. The file group allocation table is a table having the task of associating the file group with the destination network storage units of the file belonging to that file group. This table is stored within the storage device. The line 1201 shows the identification numbers 0 through 8 of the nine file groups. The line 1202 shows the identification number of destination network storage units of the file for the file group. In the example in FIG. 4, the storage destination of the file belonging to file group 1 is the network storage (unit) 1. The storage destination of the file belonging to the file group 6 is the network storage (unit) 3. Reset (or initializing(is performed during startup of the virtualizing device 3 so that the identifiers of each network storage unit will appear uniformly on line 1202 of the, file group allocation table.

The file group allocation table 120 is rewritten during adding, deleting, and leveling of the network storage units as well as during the incorporating of existing network storage units. If the file group allocation table is capable of obtaining the correspondence (match or interrelation) between the file group and the destination network storage unit, and also capable of utilizing the database without destroying this correspondence even if the virtualizing device 3 is disabled due to a problem, then any method to achieve it is acceptable.

The file group allocation table 120 is always referred to during file access so performance may drop if the group allocation is stored in the storage unit. A copy of the file group allocation table 120 stored in the storage unit may therefore be placed in a memory accessible at high speed. In that case, both the memory and storage unit must be rewritten when the group allocation table has been rewritten.

(Request Processing Means)

The processor (request processing means) 130 processes the mount request of the file system and the file access requests from the client. In the present embodiment, the client 1 and the processor (request processing means) 130 perform the file accessing exchange using the above described NFS protocol. The NFS protocol is also used for the file accessing exchange between the virtualizing device 3 and the network storage units 5, 6, 7. The client 1 may also use a protocol other than NFS of the CIFS for the file accessing exchange. For example, when the client 1 is only compatible with CIFS (Common Internet File System), then the processor (request processing means) 130 of virtualizing device 3 must perform the access dialog with the client 1 by using CIFS. To implement this, a protocol conversion module 133 for converting from CIFS protocol to NFS protocol is installed in the processor 130. When the client 1 issues a file access request to the virtualizing device 3 in CIFS protocol, the processor 130 of the virtualizing device 3 receives the request, converts the CIFS protocol into an NFS protocol and the exchange with the appropriate network storage unit 5, 6, 7 holding the target data for accessing is implemented using an NFS protocol. This same method can also be used for protocols other than for CIFS. The conversion from a CIFS protocol to an NFS protocol may also be performed by a method of the known art such as Samba. Samba is a program for accessing a UNIX file system with a CIFS protocol. The NFS joint file service provided by the virtualizing device 3 is installed in a directory within the file system 100 and this directory then disclosed by Samba to the client 1. Conversion from CIFS to NFS protocol can in this way be accomplished. This method allows simultaneously providing NFS, CIFS and other protocols.

In the NFS (Network File System), the client first of all issues a mount request to the server and the root directory (called the mount point) for the joint files on the server is mounted in a specified location of the client's file system. The processor 130 responds to the mount request by utilizing mountd of the known art to handle the mount request from the client. The mountd returns the mount point file handle (described later on) of unified virtualizing network storage system 8 to the client 1.

Access requests for files and directories specified in the NFS protocol are the CREATE request for generating files, the LOOKUP request for acquiring file handles to apply file names to, the READ request for reading files, the WRITE request for writing files, the SETATTR request for setting the file attribute, the GETATTR request for reading the file attribute, the REMOVE request for deleting a file, the RENAME request for changing the file name, the MKDIR request for generating a directory, the READDIR request for reading a directory, and the RMDIR request for deleting a directory. The operation of the processor 130 for each of the following requests is described next.

(Processing the CREATE Request)

Figure 5:
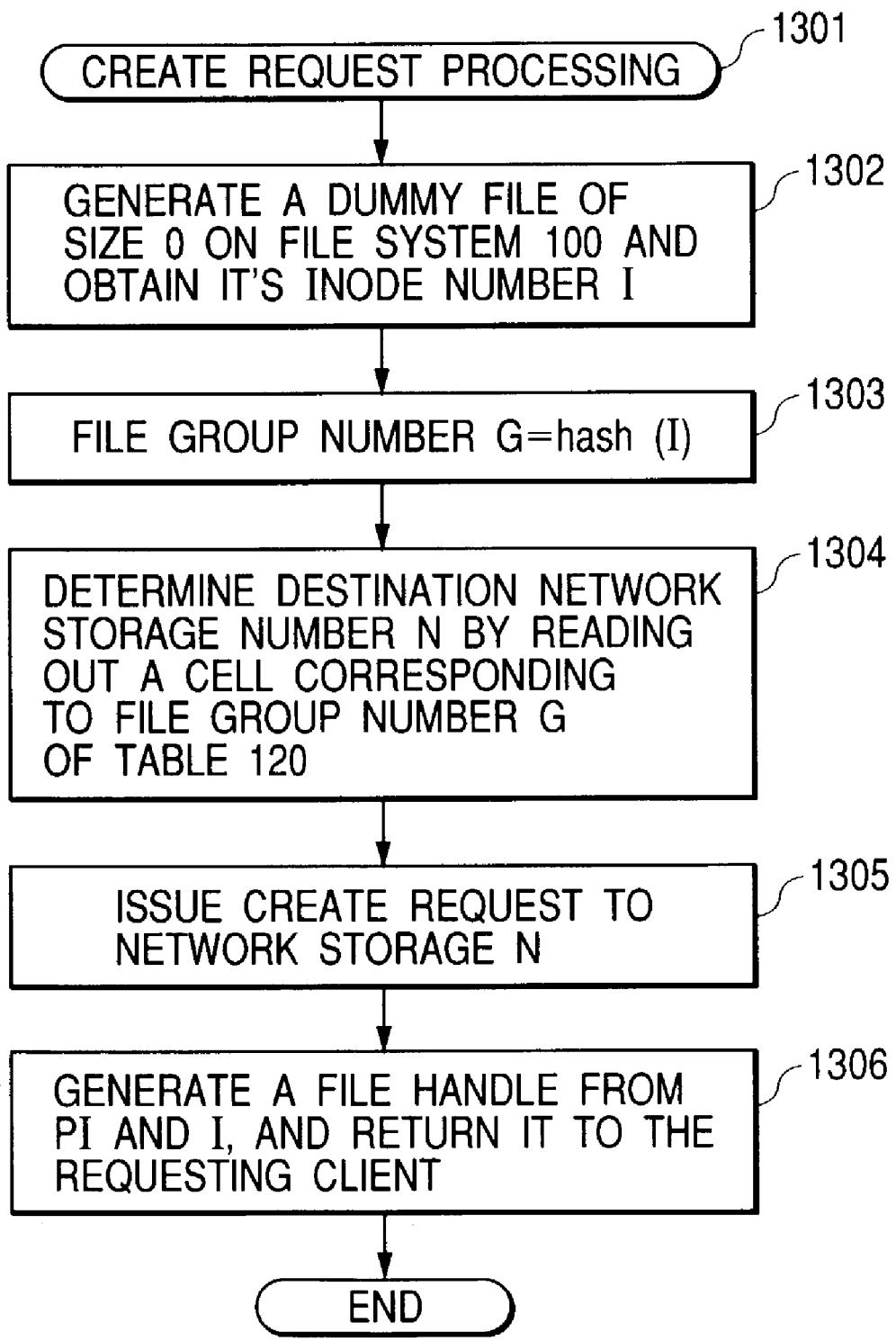
FIG. 5 is a flow chart showing the flow of the processing for the CREATE request.
Figure 6:
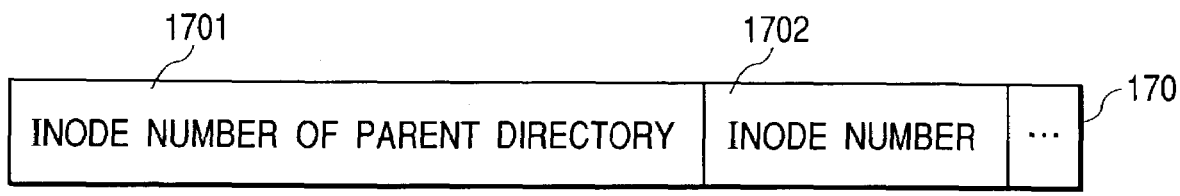
FIG. 6 is a drawing showing the structure of the file handle.

The client 1 issues a CREATE request as variables for a file handle H for a directory for generating files and a file name F for the file to be generated. The file handle is a data structure for identifying files obtained as values returned when the client 1 issues LOOKUP requests described later on. The structure of the file handle is shown in FIG. 6. The file handle 170 contains the inode field 1701 of th parent directory and the inode No. filed 1702 of the file object. When the processor (request processing means) 130 receives a CREATE request from the client 1, then 1301 of FIG. 5 is called and the request is processed. First of all, in 1302, the inode No. P1 of the parent directory for generating the file is extracted from the inode No. field 1702 of file handle H of the parent directory. A dummy file with a size 0 and file name F is then generated in the directory identified by this inode No. The inode No. of the created file is 1. Next in 1303, the hash function described in the (file map) item is applied to the inode No. 1 of the created file and the file group G found. Next in 1304, the file group allocation table 120 described in the above items (group allocation {table}) is referred to and the network storage N corresponding to the file group G is found. The network storage N that was found becomes the destination network storage (unit) for the file matching the CREATE request issued by the client 1. Then in 1305, the CREATE request sent from the client 1 is issued for the network storage units N. Finally in 1306, when the network storage device (unit) N sends back the CREATE request, in the file system 100, a file handle is comprised from an inode No. PI of the directory that generated the dummy file and the inode No. 1 of that dummy file, and that file handle is sent back to the client 1 that made the original request and the processing ends.

(Processing the LOOKUP Request)

Figure 7:
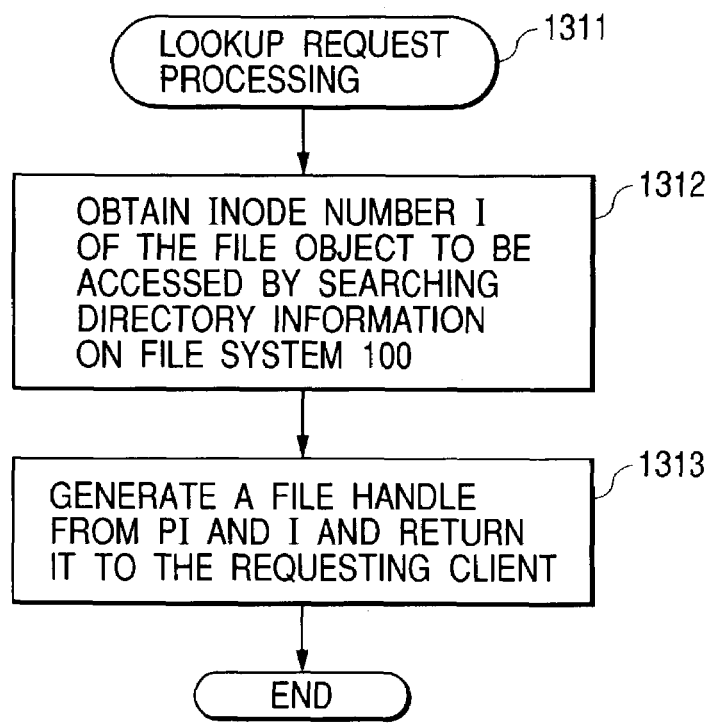
FIG. 7 is a flow chart showing the flow of the processing for the LOOKUP request.

The client 1 issues a LOOKUP request consisting of the variable F as the name of the file object for acquiring the file handle and the variable H as the file handle of the parent directory of that file object. When the processor (request processing means) 130 receives the LOOKUP request from the client 1, 1311 of FIG. 7 is called. First of all in 1312, the inode No. P1 of that parent directory is extracted from the 1702 field of file handle H of the parent directory, and the inode No. 1 of the file object of name F present in the directory identified by that inode No. is acquired. Next, in 1313, a file handle is comprised from the inode No. P1 of the parent directory and the inode No. 1 of that file, that file handle is sent back to the client 1 making the request and the processing ends.

(Processing the READ Request)

Figure 8:
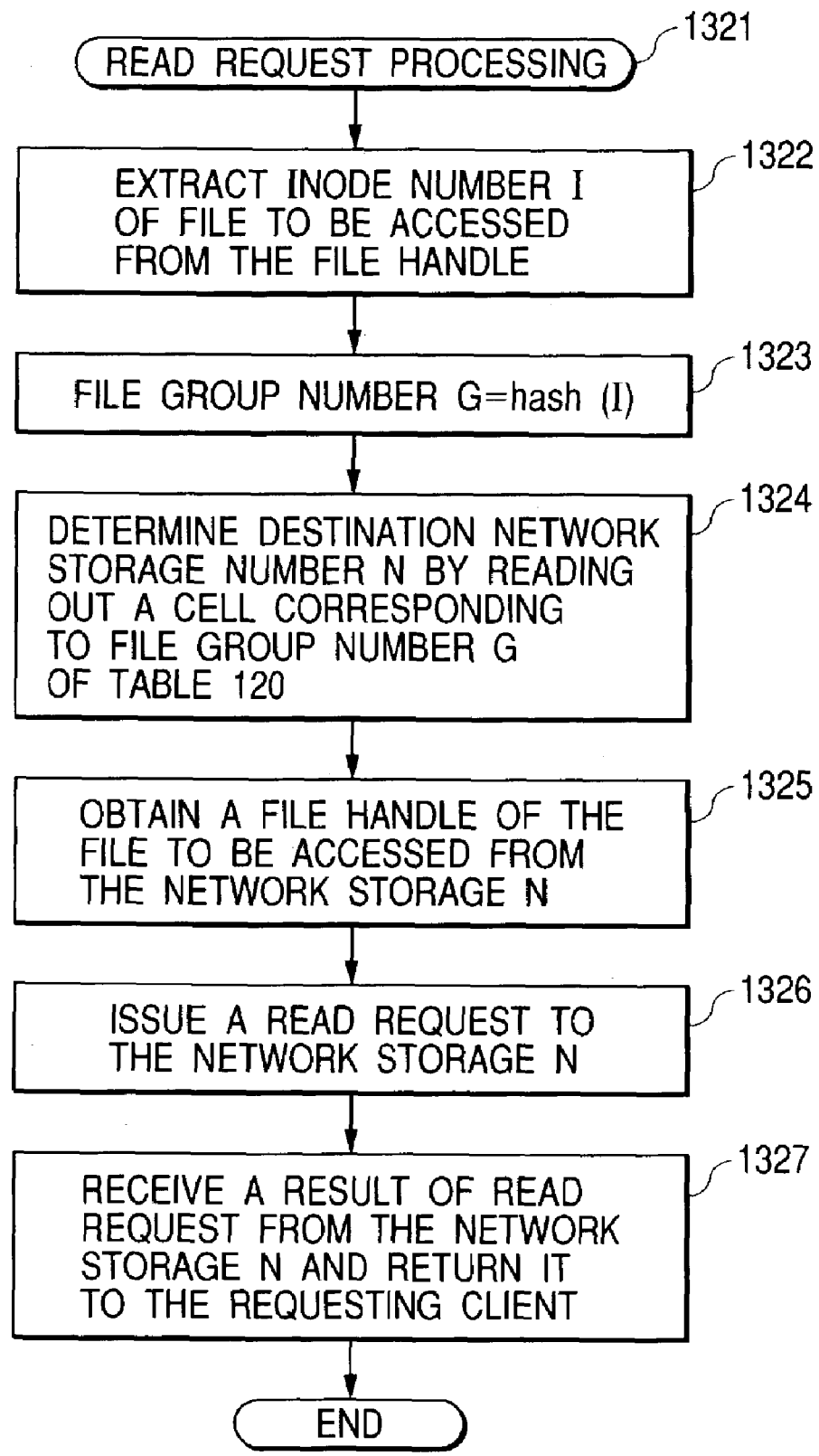
FIG. 8 is a flow chart showing the flow of the processing for the READ request.

The client 1 issues a READ request consisting of the variable Hp as the file handle of the parent directory of the file for read-out and the variable H as the file handle of the file for read-out. When the processor (request processing means) 130 receives the READ request from the client 1, 1321 of FIG. 8 is called and the request is processed. In 1322 first of all, the inode No. 1 is acquired from the inode No. field 1702 of the field handle H. Next, in 1323, the hash function is applied to the inode No. 1 of the created file and the file group G found. Next in 1324, the file group allocation table 120 is referred to and the network storage N corresponding to the file group G is found. In 1325, the LOOKUP request is issued for the network storage N, and the file handle Hn for the network storage N corresponding to the file itself identified by the handle H as the access target of the READ request is acquired. In 1326, the acquired file handle Hn is issued as a variable to the network storage N as the READ request. In 1327, when the network storage N returns the read-out results comprising the return value of the READ request, the acquired read-out results are returned to the requesting client 1.

The processing when the client has issued a WRITE request is basically the same as for the READ request processing. In 1326, a WRITE request may be issued to the destination network storage N instead of issuing a READ request to the destination network storage N. The processing for the RENAME request and the REMOVE request are also the same.

(Processing the MKDIR Request)

Figure 9:
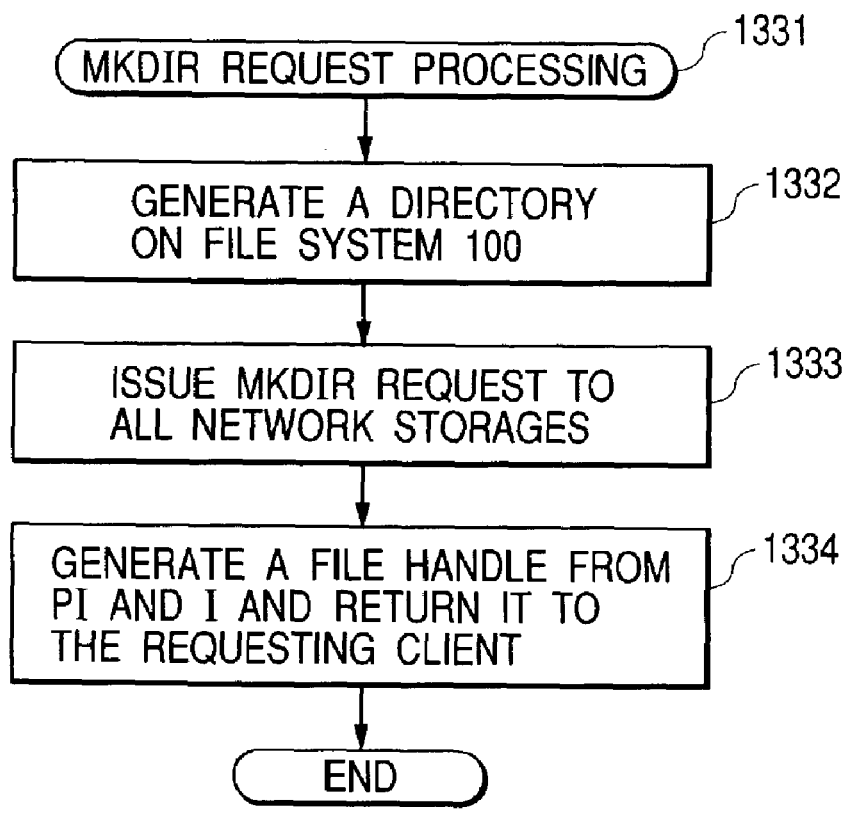
FIG. 9 is a flow chart showing the flow of the processing for the MKDIR request.

The client 1 issues the MKDIR request as the variable name D of the directory and file handle H of the parent directory. When the processor (request processing means) 130 receives the MKDIR request from the client 1, 1331 of FIG. 9 is called and the request is processed. In 1332 first of all, the directory named D is generated in the file system 100 in the directory identified by the inode No. stored in the inode No. field 1702 for file handle H. The inode No. of the created directory is made I. Then in 1333, the name D directory is generated for issuing the MKDIR requests to the respective network storage units. Then in 1334, a file handle is generated from the value of inode No. field 1702 of file handle H and from inode No. 1 of the generated directory and that file handle is returned to the requesting client 1. The processing is the same for the RMDIR request, and the MKDIR requests may all be changed to RMDIR requests.

In the case of the GETATTR request and SETATT request, when and the file object to be accessed is a directory, then the GETATTR request or SETATT request can be issued to each network storage unit the same as for the processing of the MKDIR request, and the directory attributes then set. When the file object to be accessed is a file, then the GETATTR request or SETATT request can be issued to each destination storage unit of the file to be accessed, the same as when processing the READ request.

The processing for the READDIR request is the same as for the LOOKUP request processing and the information of the target directory may be read out by the file system 100 and returned to the client.

The processing by the processor (request processing means) 130 has now been described in detail. Here, the making and accessing by the client 1 of a directory and file having the structure as in FIG. 3 will be described as a typical example. First of all, it is assumed that absolutely no directories or files are present in the unified virtualizing network storage system 8. A total of nine file groups from 0 through 8 are provided. The group map utilizes the following hash function:

$$\text{Hash}(I) = I/9$$

The client first of all issues a mount request to the virtualizing device 3, and the processor (request processing means) 130 sends back the file handle of that mount point. The client 1 next issues the MKDIR request as variables for the mount point file handle and the name d1 of the generated directory. The processor (request processing means) 130 of the virtualizing device 3 generates directories in the file system 100 and each of the network storage units 5, 6 7. Next, when the client 1 issues the MKDIR request as variables comprising the generated file handle of d1 and the directory name d2, the processor (request processing means) 130 of the virtualizing device 3 generates a directory d2 in the file system 100 and each of the network storage units 5, 6, 7. The client next issues a CREATE request as variables comprised of the file handle directory d2 and the file name f1. Whereupon, the processor 130 of the virtualizing device 3 generates a dummy file with a size 0 and having the file name f1 in the directory d2 of file system 100. The inode of the generated directory and file and the directory entry are assumed to have a structure as shown in FIG. 2 (This drawing contains an inode and directory entry equivalent to the directory d3 and files f2, f3 prior to generation.). The inode equivalent to the file f1 is 1005 and its inode No. is 10. At this point, the processor 130 applies the previously described hash function (1) to inode No. 10 and it can be seen that the file group that file f1 belongs to is No. 1. Next, on referring to the file group No. 1 row of file group allocation table 120, it can be seen that the destination network storage (unit) of that file is No. 1 (5 of FIG. 1). Therefore, the processor 130 issues a CREATE request to the network storage (unit) 5 and generates the actual file f1 under the directory d2. When the client 1 issues a CREATE request for file f2, a dummy file with the name f2 is generated in the file system 100 in the same way. The inode of the generated dummy file is 1006 in FIG. 2 and its inode No. is 14 so the processor 130 applies the previously described hash function (1) to it and one can see that the file group that the dummy file belongs to is No. 5. Next, referring to the file group allocation table 120 shows that the destination network storage unit is No. 2 (6 in FIG. 1) so a CREATE request is issued in the network storage unit 6 and the actual file f2 is generated under directory d2. When a directory d3 is generated in the same way under d1, and the file f3 is generated under the directory d3, the file system 100 has the structure shown in FIG. 2, and the files f1, f2, f3 are allocated within the storage units 11 of 5, 6, 7 of FIG. 1. Next, the case is described wherein the client 1 issues a READ request for the f. The client 1 first of all issues a LOOKUP request with the mount point file handle and the directory name d1 as variables. The processor 130 sends back the file handle of directory d1 to the client 1. The client next issues a LOOKUP request with the file handle of directory d1 and the directory name d3 as variables and the processor 130 sends back the file handle of directory d3 to the client 1. When the client 1 next issues a LOOKUP request specifying the file handle of directory d3 and the file name f3, the processor 130 sends the file handle of file f3 (comprised of the inode No. of the dummy file of file f1 in the file system 100 and the inode of its parent directory) back to the client 1. The client 1 thereupon issues a READ request with the file handle of directory d3, and the file handle of file f3 as variables. In response to that request the processor 130 extracts an inode No. for a dummy file equivalent to file f3 from the file handle of file f3. Since the inode number is No. 16, a hash function (1) is applied to it and the file group 7 acquired. Referring to the file group allocation table 120 shows that the destination network storage unit of file group 7 is No. 3 (7 in FIG. 1) so the processor 130 issues a READ request to the network storage unit 3 and reads out the file f3. When the readout data from the network storage unit 3 is sent back, the processor (means) 130 returns it to the requesting client 1. In this way, when the client simply issues a request for access to a normal network storage unit, the processor 130 finds the destination network storage unit of the file to be accessed and accesses the file by sending file access processing to that network storage unit. The client therefore views the unified virtualizing network storage system 8 as if it were one network storage unit.

(Available Disk {Size} Monitoring Means)

Figure 10:
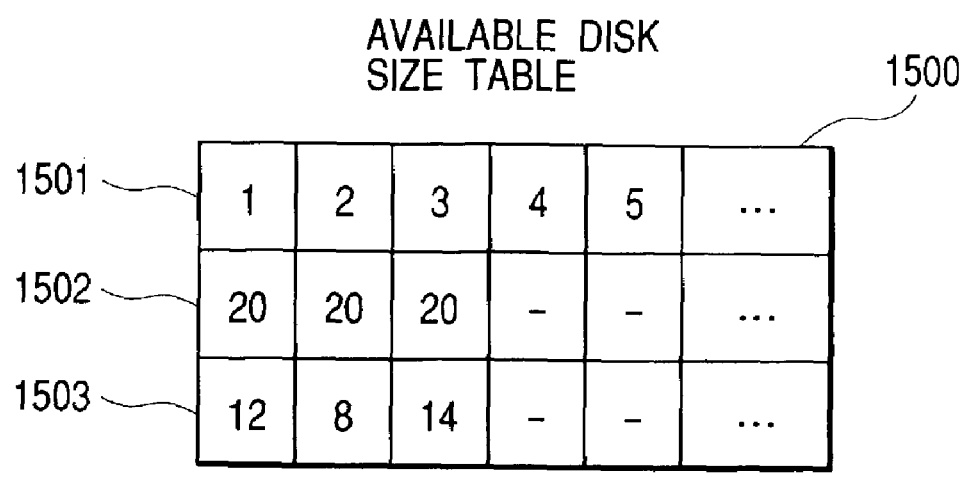
FIG. 10 is a drawing showing the available disk size table.

The available disk size monitoring means periodically finds the remaining available amount of disk size in each network storage unit and writes that quantity in the available disk size table 1500 of FIG. 10. When the available disk size in any network storage unit is found to be below an established value, the disk monitoring means also uses a mover (means) module described later on to move a file or send a message to the administrator urging the addition of new network storage units.

Figure 11:
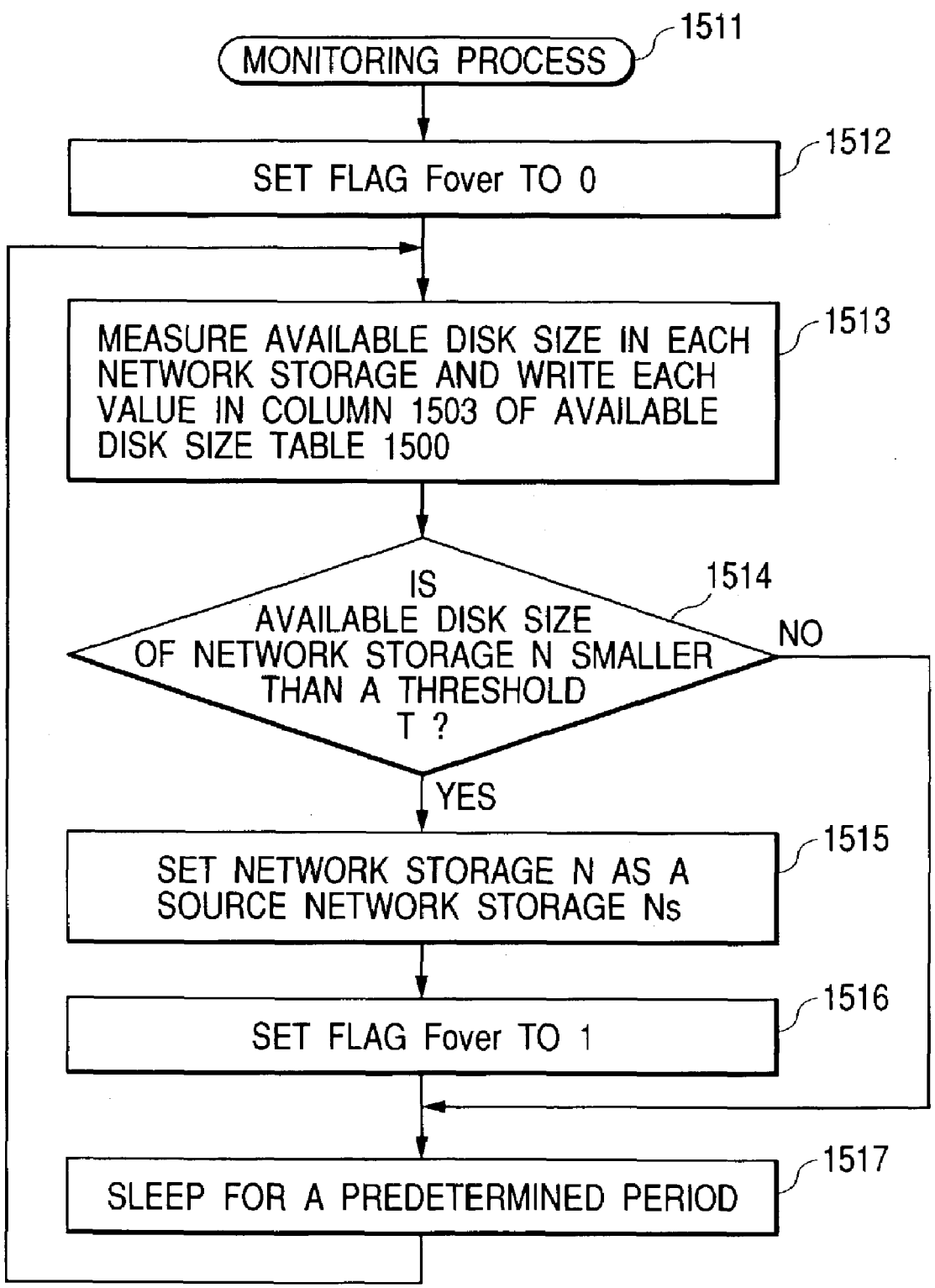
FIG. 11 is a flow chart showing the flow of the processing for the available disk size (capacity) monitoring process.

The available disk size table 1500 is a table for recording the latest information on the available (remaining) disk size of each network storage unit. The line 1501 shows the identifiers of each network storage unit. The line 1502 records the maximum disk size (available disk space when not even one file is stored) of each network storage unit. The line 1503 is the currently available (remaining) disk size of each network storage unit. In the example of FIG. 10, when using disk size units are in GB, then the maximum disk size of network storage units 1, 2, 3 are 20 GB (gigabytes), and the maximum available disk sizes are respectively 12 GB, 8 GB, and 14 GB. The usable disk size may be recorded in line 1503 instead of the available (remaining) disk size. FIG. 11 shows the processing flow of the available disk size monitoring means. When the virtualizing device 3 starts up, a new thread or process is generated in 1511, and the size of each network storage unit is monitored simultaneously with the file accessing of the processor (request processing means) 130.

First of all, the flag Fover is reset to 0 in 1512. Fover is a flag commanding the start of the leveling process by the mover (means) module described later on. Next in 1513, the available disk space of each network storage unit is acquired, and the values obtained are written into line 1503 of the available disk size table 1500. The available (remaining) disk size may be calculated by issuing a STATFS procedure in each network storage unit and acquiring (results) and almost any method may be used if capable of acquiring the available disk size of the network storage units through the network. Next in 1514, a check is made to find if the available disk size of each network storage unit acquired in 1513 is below a predetermined threshold T. If below that threshold, the processing from 1515 onwards is implemented. The threshold T specifies a value larger than 0 and also smaller than the maximum disk size of the network storage units. When the disk size (capacity) for example is 100 GB for network storage, then a figure between 1 and 10 GB is appropriate however values other than this are also acceptable. In 1515, a network storage unit N whose available disk space has fallen below the threshold T is set in the movement source network storage Ns, and the Fover flag set to 1 in 1516. The mover (means) module 140 constantly monitors this flag and when the value is set to 1, starts the leveling process described later on. A certain number of file groups of network storage unit N set by the movement source, are moved to other network storage units and leveling of the available disk space performed on each network storage unit. Then in 1517, after a fixed sleep period, the routine returns to the processing of 1513. However, in 1514, when none of the available disk space has fallen below the threshold T, the processing returns to 1513 after a fixed sleep period. In 1517, the sleep time may be set to a minimum of one second or one minute or one hour or one day and any other setting is allowable. The shorter the sleep time, the better the accuracy for discovering sudden increases in disk size (capacity). Conversely, the process for monitoring the disk size functions frequently so that processing by the virtualizing device becomes sluggish. A suitable sleep time should therefore be set according to the extent of the increase or decrease in disk size (capacity).

The condition of 1514 may be made a condition wherein the differential between the maximum available (remaining) disk size and minimum available (remaining) disk size is larger than a predetermined threshold Td. At this time the threshold Td can specify a value from 0 up to the network storage disk (capacity) size. For example, if the network storage disk size is 100 GB, then a value from 1 GB to 10 GB is appropriate however other values are also acceptable. When the conditions of 1514 have been changed as described above, then the processing of 1515 at this time can be changed so that the network storage unit with the smallest remaining disk size (capacity) is set in the movement source network storage (unit).

Further, the condition of 1514 may be changed to a condition dependent on whether or not the total available (remaining) disk size of all network storage units fall below a predetermined threshold value Tt, and 1515 eliminated, and 1516 changed to send a message to the administrator that the available remaining disk size is small and requesting the adding of new network storage units. The means for sending the message may be a technology of the known art such as sendmail for sending mail to the administrator and, a message may also be sent on the administrator interface through management (means) module 180.

(Mover Means)

The mover module 140 moves files stored in the network storage unit to undergo structural changes, when adding or deleting network storage units and changing the composition of the unified virtualizing network storage system 8. In this way, changes can be flexibly made in the structure of the unified virtualizing network storage system. When irregularities outside of the specified range have occurred in the remaining available disk size of the network storage units, the mover module 140 moves the files between the network storage units and streamlines (or levels) the remaining available disk size. If the files are not moved, the writing of files will become absolutely impossible at the point where any of the network storage units becomes full, even if the other network storage units are empty. By moving the files as described above, nearly all of the network storage disk size capacity can be used.

The mover (means) module 140 contains four functions. These functions are a basic move function, a move function when adding network storage, a move function when deleting network storage, and a leveling function. Each function has respective move processing, add processing, delete processing and leveling processing. A detailed description of the respective processing is given next.

(Move Processing)

Figure 12:
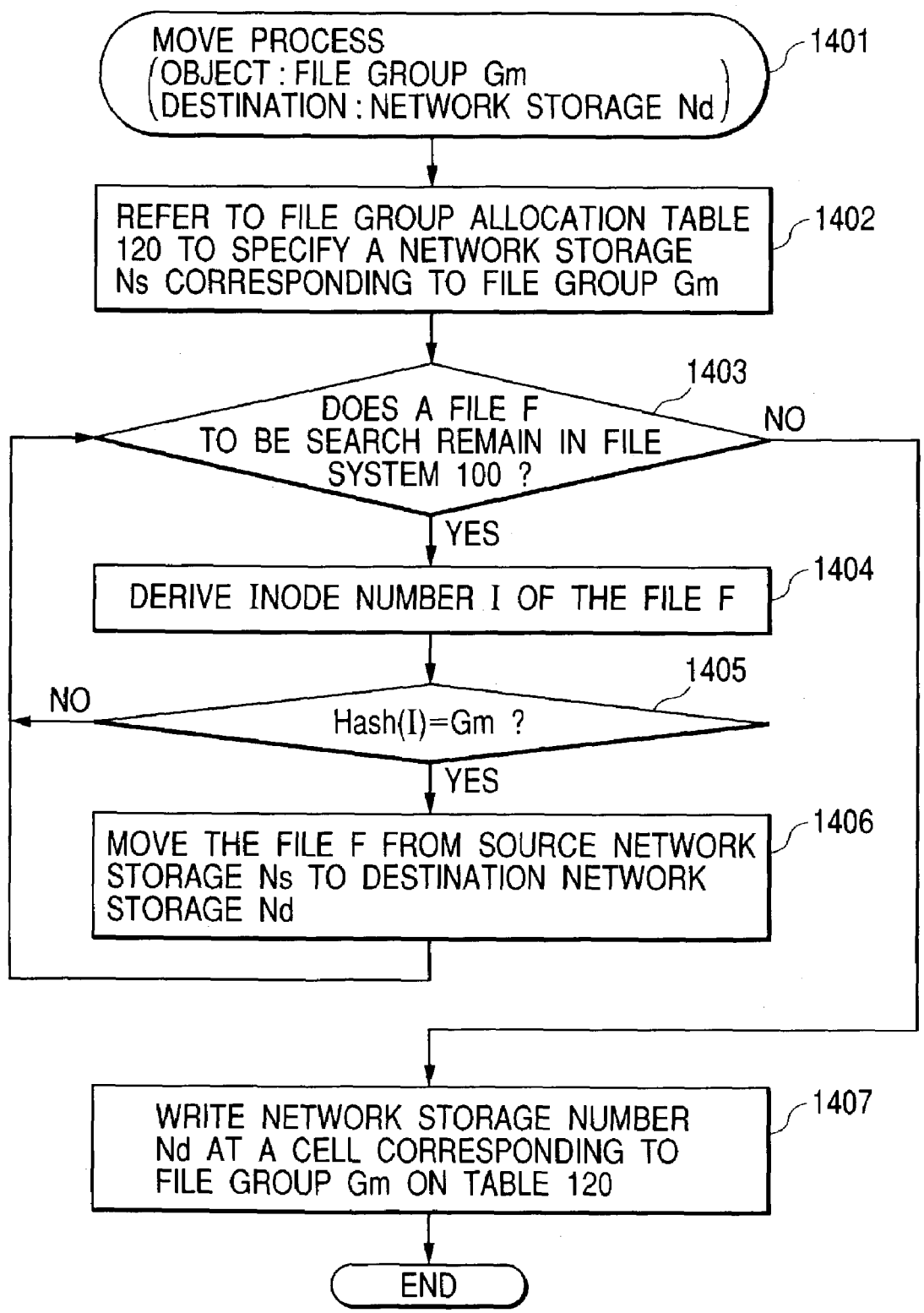
FIG. 12 is a flow chart showing the process for moving file groups between network storage units.

In the move process, files are moved in file group units from the currently stored network storage unit to another network storage unit. The flow of the move process is shown in FIG. 12. When the file group Gm to be moved and the move processing 1401 for setting movement destination network storage ND are called, the mover (means) module 140 moves the file group Gm from the currently stored network storage unit to the destination network storage unit Nd. In the move process first of all, the file group allocation table 120 is referred to in 1402, and the file of the Gm group to be moved is found in the currently stored network storage group Ns. Next, a search is made one by one for the files of file system 100 from the routing directory /, and files belonging to the file group Gm are designated. Therefore, a check is made in 1403 whether the file F to be searched for is present and if present, the inode No. of the file F is found in 1404. In 1405, the hash function is applied to the inode No. of the file F, and the file group that the file F belongs to is found. When that file group matches the movement target file group Gm, then in 1406, the file is moved from the network storage device Ns to the destination network storage unit Nd. In this move process, the mover module 140 issues a READ request for the file F to the movement source network storage Ns and reads out the file. The contents that were read out are issued unchanged as variables of WRITE request to the movement destination network storage Nd and the file is written. Finally, the file F of the movement source network storage unit is deleted. Alternatively, the movement source file may be deleted after copying the file from the movement source to the move destination by utilizing FTP (File Transfer Protocol). Any method may be utilized if the file is moved from the movement source network storage unit to the movement destination network storage unit. When movement is completed, 1403 is returned and the processing continues. When the file being searched for in 1403 is not present, then movement of all files belonging to the file group Gm for movement is finished so in 1407 the movement destination network storage unit Nd is written in the box of file group Gm of the file group allocation table 120, and the processing ends.

This move processing is called when the administrator of the unified virtualizing network storage system 8 of the present invention specifies the file group Gm for movement and movement destination network storage Nd and gives movement instructions through the user interface to the management (means) module 180. The move processing may also be called for use in the add process, the deletion process, or the leveling process.

When there is an access request from the client 1 after the move processing, for accessing the file F that was changed per the destination network storage unit in the move processing, the processor (means) 130 refers to the file group allocation table 120 that was changed in 1407, and specifies the destination network storage unit. The client 1 can therefore correctly access the file F even if the storage destination network storage of the file F is changed.

When the client 1 has issued an access request for a file belonging to the file group Gm during ongoing movement of the file group Gm by the mover (means) module 140, the processor (means) 130 will not execute the file access request from the client until movement of the file group Gm has ended.

(Add Processing)

When the disk (capacity) size of the unified virtualizing network storage system 8 is insufficient, the virtualizing device 3 of the present invention can increase the disk capacity size by adding new network storage units.

Figure 13:
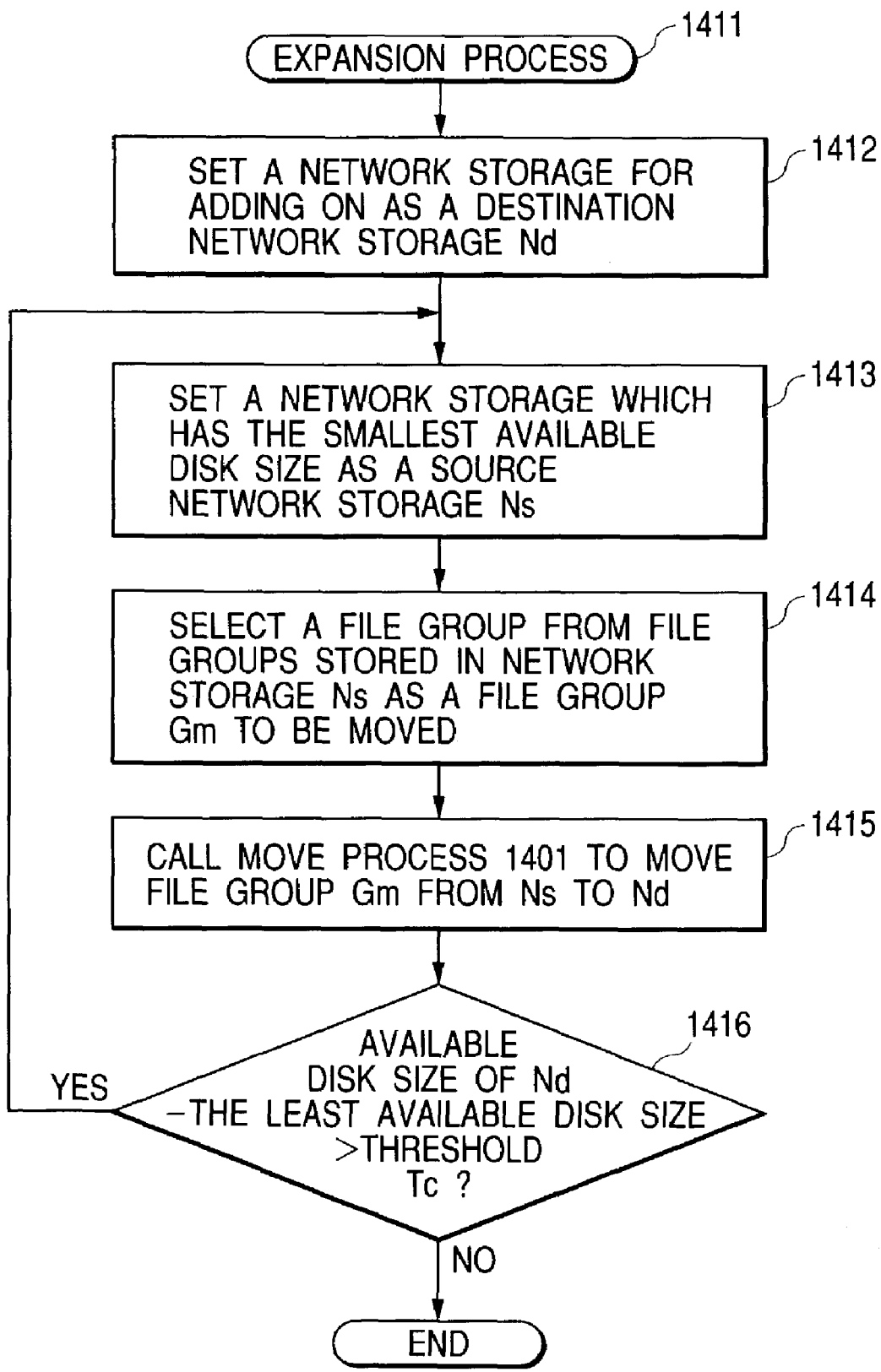
FIG. 13 is a flow chart showing the process for adding network storage units.

The administrator of the unified virtualizing network storage system 8 connects through the network 4 to the network storage unit for addition, accesses the management (means) module 180 through the user interface, and commands the start of add processing. The management (means) module 180 thereupon calls the add process (1411 of FIG. 13) of the mover (means) module 140.

In the add processing, when a network storage unit was added to the unified virtualizing network storage system 8, the currently existing network storage unit is moved to a network storage unit added with a number of file groups constituting the storage destination. The added network storage units are in this way entered into the unified virtualizing network storage system. The process flow is shown in detail in FIG. 13. In 1412, first of all, the network storage unit for adding is set into the destination network storage Nd. Next, in 1413, the line 1503 of the available disk size table 1500 is referred to and the network storage unit with the smallest available disk space is made the movement source network storage Ns. Then in 1414, the file group allocation table 120 is referred to and the file groups constituting the storage destination of the movement source network storage Ns are found. One file group is randomly selected from those file groups and that file group is set in the file group Gm that is to be moved. Then the move processing 1401 of FIG. 12 is called, and the file group Gm for movement is moved from the movement source network storage Ns to the movement destination network storage Nd which is the added network storage unit. When the movement ends, the available disk size table 1500 is referred to, the available (remaining) disk space of the movement destination network storage Nd and the smallest available (remaining) disk space are found. If the differential between these two disk spaces exceeds a predetermined threshold Tc, then the processing continues after returning to 1413. However if the differential does not exceed Tc, then the processing ends. The threshold Tc may be 100 MB, 500 MB, or 1 GB or and value. To shorten the time required by the move processing when adding network storage units, the threshold can be set to a larger value. If one wishes to reduce the differential in available (remaining) disk space between network storage units even though more time will be required, then the threshold can be set to a small value.

Among methods for selecting the movement source network storage unit in 1413, a selection may be made randomly, the selection may be made in a predetermined sequence, and any method may be utilized. Also, the method for selecting the file group Gm in 1414 may be random selection or any other method may be utilized. Further, instead of deciding the end of processing in 1416 by the available (remaining) disk space, the condition for the process ending can be made that the number of moved file groups exceeds a predetermined value.

After the add processing, if the client 1 issues a file access request and if the target of the access request is a file belonging to a file group that was moved to the added network storage unit by the add processing, then the processor (means) 130 sends the access request from the client 1 to the added network storage unit and performs the file access processing with the added storage unit. In this way, even if network storage units are added to the unified virtualizing network storage system, the file access procedure as seen from the client 1 has not changed from the time before the storage units were added. The one difference as seen from the client 1 is that disk space (capacity) of the unified virtualizing network storage system has been added to by an amount equal to the capacity of the added network storage units.

(Delete Processing)

In the virtualizing device 3 of the present embodiment, the network storage units within the system can be extracted and the disk size (capacity) can be reduced for reasons such as that there is surplus disk space (capacity) not being utilized in the unified virtualizing network storage system 8. However, being able to reduce the network storage is limited to use on occasions where the available space of the overall system is larger than the network storage disk size (capacity).

Figure 14:
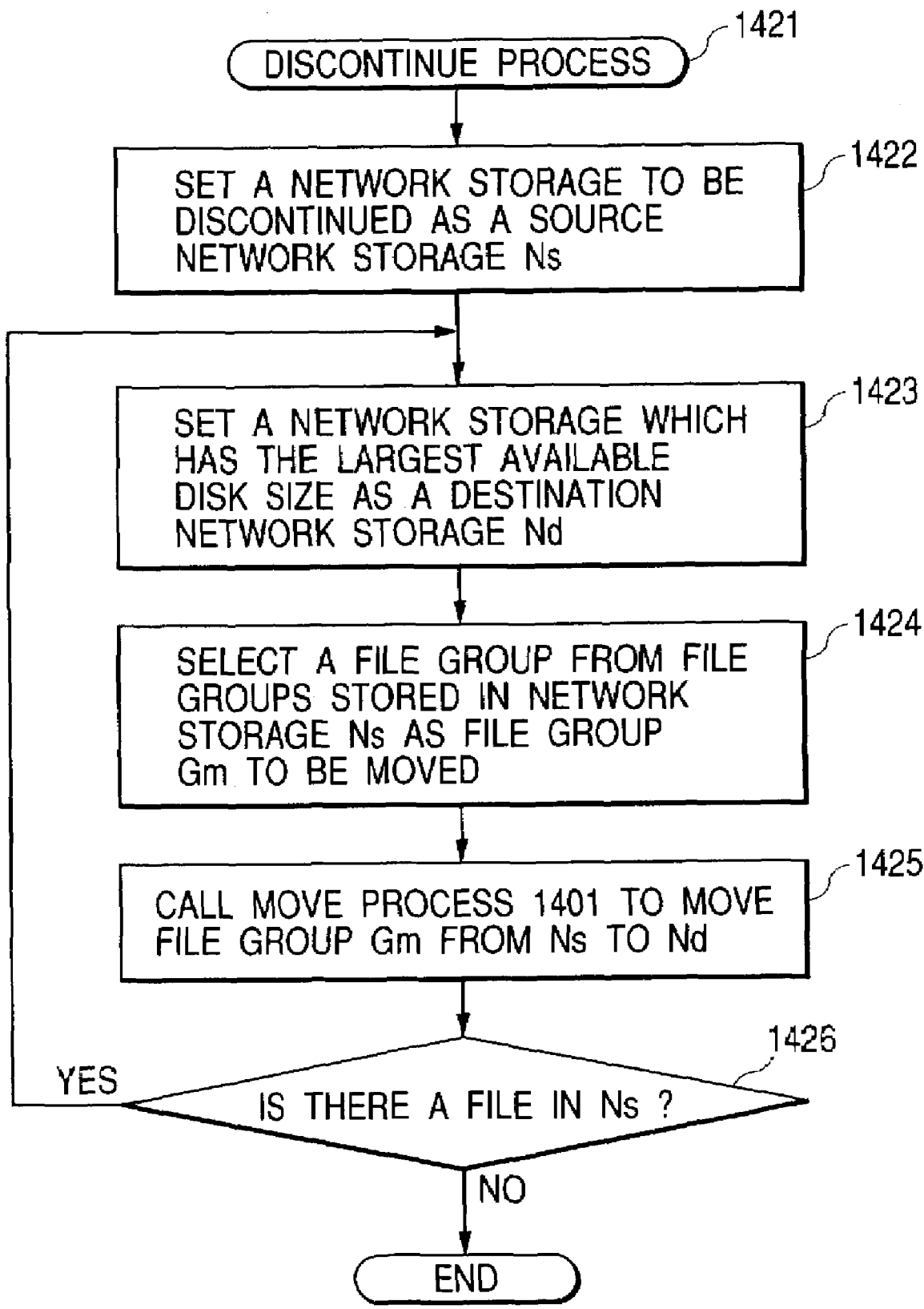
FIG. 14 is a flow chart showing the process for deleting network storage units.

The administrator of the unified virtualizing network storage system 8 accesses the management (means) module 180 through the user interface, selects the network storage units for deletion and commands the start of delete processing. The management (means) module 180 thereupon calls the delete process (1412 of FIG. 14) of the mover (means) module 140.

In the delete processing, when deleting any of the network storage units 5, 6, 7 from the unified virtualizing network storage system 8, the network storage unit for deletion is moved to another network storage unit comprised of all file groups constituting the storage destination. The network storage unit for deletion is then logically separated from the unified virtualizing network storage system. The process flow is shown in detail in FIG. 14. In 1422, first of all, the network storage unit for deleting is set into the movement source network storage Ns. Next, in 1423, the line 1503 of the available disk size table 1500 is referred to and the network storage unit with the largest available (remaining) disk space is made the movement destination network storage Nd. Then in 1424, the file group allocation table 120 is referred to and the file groups constituting the storage destination of the movement source network storage Ns are found. One file group is randomly selected from those file groups and that file group is set into the file group Gm that is to be moved. Then the move processing 1401 of FIG. 12 is called, and the file group Gm for movement is moved from the movement source network storage Ns as the network storage unit for deletion, to the movement destination network storage Nd. When the movement ends, in 1426, if a file group is present in the movement source network storage Ns, then the processing continues after returning to 1423. However, if no file group is present, then the processing ends.

Among methods for selecting the movement source network storage unit in 1423, if the available (remaining) disk space of the network storage unit is larger than the disk space of the file group, then a selection may be made randomly or a sequence may be selected beforehand and that sequence then selected for use. Also, the method for selecting the file group Gm in 1424 may be random selection or any other method may be utilized.

When the delete processing ends, the management (means) module 180 notifies the administrator of the end of delete processing over the interface. On receiving this notification, the administrator logically separates the network storage unit that was deleted, from the network 4.

After the delete processing, when the client 1 issues a file access request and if the target of the access request is a file belonging to a file group that was a storage destination for the network storage unit prior to the delete processing, then the processor (means) 130 sends the access request from the client 1 to the destination movement network storage unit rather than the deleted network storage unit, and performs the file access processing. In this way, even if network storage units were deleted from the unified virtualizing network storage system, the file access procedure as seen from the client 1 has not changed from the time before the storage units were deleted. The one difference as seen from the client 1 is that disk space (capacity) of the unified virtualizing network storage system has been reduced by an amount equal to the capacity of the deleted network storage units.

(Leveling Processing)

Figure 15:
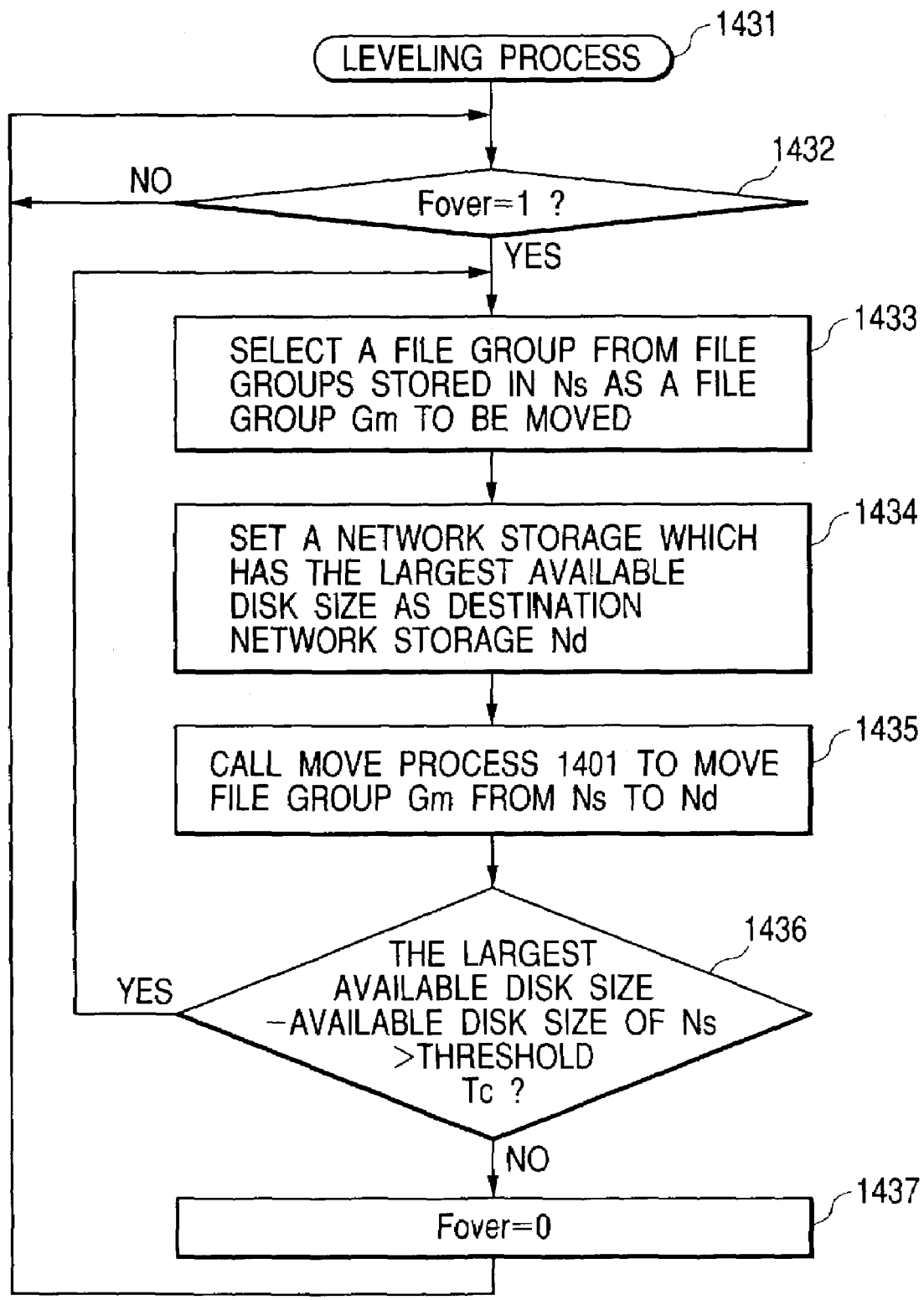
FIG. 15 is a flow chart showing the process for leveling the available disk size (capacity) of each network storage unit when nonuniformities or imbalances have occurred in the available disk size (capacity) of the network storage units.

When the client 1 issues a write request for a file to the unified virtualizing network storage system 8, and there is no available space (remaining capacity is 0) in the destination network storage unit of the file for writing, then writing of that file is impossible even if there is a large amount of available space in other network storage units. To cope with this kind of situation, when the available disk space (capacity) of the network storage unit is small or the differential between network storage units widens, the virtualizing device 3 starts the leveling processing and moves the file groups so that the available disk space (capacity) will be uniform among the network storage units. The leveling process is started (1431 of FIG. 15) as a process or thread separated by the mover (means) module 140 during startup of the virtualizing device 3. The leveling process is shown in detail in FIG. 15. The leveling process works in the background however no processing is performed while the Fover flag in 1432 is set at 0. As described previously (available disk size monitoring module), when the available disk space (capacity) has fallen below a predetermined threshold, that network storage unit can be set as the movement source network storage Ns, and the Fover flag is set to 1. When the differential between the maximum available disk space and minimum available disk space in network storage units has exceeded the threshold, the network storage unit with the smallest available disk space (capacity) can also be set in the movement source network storage Ns, and the Fover set to 1. When the Fover flag is set to 1, the leveling process in 1433 randomly selects one movement source network storage Ns from among the file groups to form the destination storage (location) and sets the file group Gm for moving. In 1434, the network storage unit with the maximum available disk space is set as the movement destination network storage Nd, and in 1435 the file group Gm called by the move processing of 1401 is moved from the movement source network storage Ns to the movement destination network storage Nd. In 1436, if the differential between the maximum available disk space and minimum available disk space in network storage units in the previously described add process is larger than the threshold Tc, then the routine returns to 1433 and the processing continues. If the differential is smaller than the threshold Tc, then the Fover flag is set to 0 and the routine returns to 1423. In the method in 1433 for selecting the file group Gm from the NS, a method for selecting in a predetermined sequence may be used. Also in 1434 any other selection method may be used if it is capable of selecting the network storage unit set in Nd from among network storage units other than the movement source network storage Ns.

The above processing makes the difference in disk space (capacity) between network storage unit small and resolves the problem of being unable to write a file due to insufficient disk space in the designated network storage unit.

In the above example, leveling was performed automatically. However the administrator may access the management (means) module 180 through the user interface and then command the execution of the leveling process. The administrator at this time gives the movement source network storage units as variables. The mover (means) module 140 calls 1433 in FIG. 15 and performs the level processing. The process ends in 1436 when the conditions cannot be satisfied. Preferably a method is used wherein the management (means) module 180 provides information in the available disk size table 1500 to the administrator in real-time through the user interface and helps the administrator decide whether to perform the leveling process, add process or the delete process.

(Unifying Means)

On sites using general network storage rather than the unified virtualizing network storage system 8 of the present invention, when the network storage capacity is inadequate, usually new network storage units are purchased. However, in such cases the already existing network storage and the newly purchased network storage appear separate from each other as seen from the client so they are inconvenient to use. To cope with such problems, the virtualizing device of the present invention utilizes a unifying (means) module 160 to configure a unified virtualizing network storage system to incorporate existing network storage units and provide unified virtualizing network storage of even larger capacity (or disk size) containing the existing network storage files.

Figure 18:
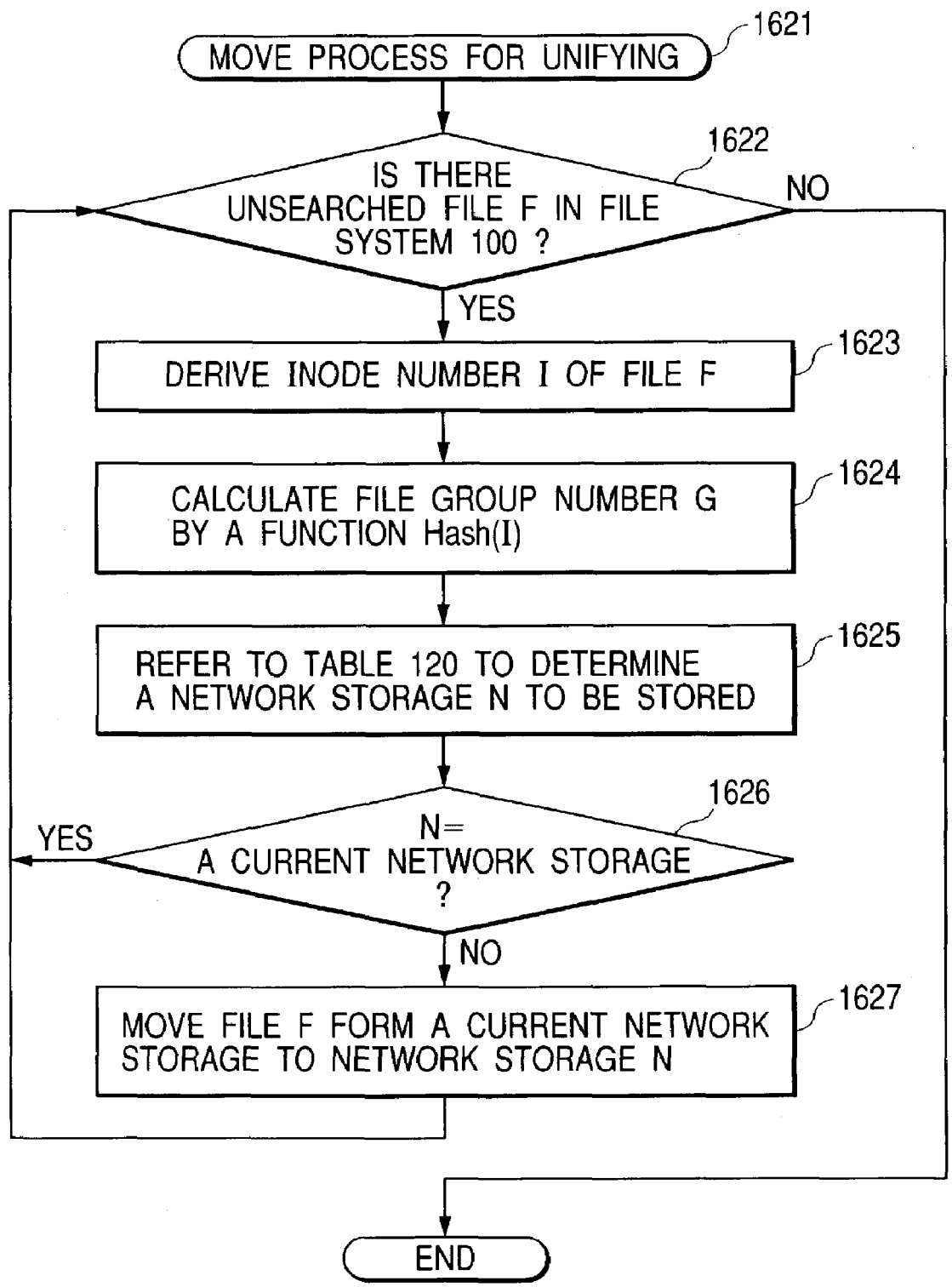
FIG. 18 is a flow chart showing the process flow for moving files when unifying the existing network storage devices.

An existing network storage unit is connected to the network 2 in FIG. 1, and the file of the client 1 is stored in the existing network. The administrator connects the unified virtualizing network storage system 8 to the network 2, and accesses the management (means) module 180 of the virtualizing device 3 through the user interface. The unifying (means) module 160 of the virtualizing device 3 thereupon calls 1601 of FIG. 16 and the unifying process starts. In the unifying process, first of all in 1602, one from among the existing network storage units or the added network storage units are respectively written in the network storage box corresponding to the file groups of the file group allocation table 120. For example, with four file groups 1 through 4, when there are two network storage (units) namely an existing and an added storage unit; the existing network storage unit is linked to the file groups 1 and 2, and the added network storage group is linked to the file groups 3 and 4. Alternatively, the existing network storage unit may be allotted to all the file groups and the other units may be allotted as desired. By writing the network storage units in the file group allocation table 120 in this way, the existing network storage units are unified (integrated) with the unified virtualizing network storage system 8 and immediately after operation starts, the destination network storage units for the file group are determined. Next, 1661 of FIG. 17 is called next in 1603. Then in 1662, a check is made whether or not still unsearched file object F is present in the existing network storage unit. If an unsearched file object F is present, then a check is made in 1613 to determine whether the file object is a directory or not. If the file object is a directory, then a directory F is generated in 1614 in the file system 100 of the virtualizing device 3 and the processing continues on returning to 1612. In 1616, a dummy file with the same. name and attributes as the file F is generated with a size of 0 in the file system 100, and the processing continues on returning to 1612. If there is no still unsearched file object present in 1612, then the processing of 1603 in FIG. 16 ends. Next, in 1604, 1621 of FIG. 18 is called. A check is thereupon made in 1622 to determine if an unsearched file object F exists in the file system 100. If an unsearched file object F is present, then the inode of the file F is found in 1623. In 1624, the hash function given in the group map 110 to the inode No. is applied to the file group G belonging to file F and found. In 1625, the destination network storage N of the group file G is found by referring to the file group allocation table 120. This destination network storage N is set in 1602 of FIG. 16. Since all file groups are stored in the existing network storage (unit) at the current point in the unifying process, when the destination network storage N of the file group G found in 1625 is in an existing network storage unit, the current status does not have to be made to match the (1626) group allocation, and the process continues on returning to 1622. In 1626, if N is not in the existing network storage, then in 1627 the file F is moved from the existing network storage unit to the network storage unit N. As a movement method, a READ request may be issued to the existing network storage unit and the file F read, a WRITE request for the read-out data then issued as variables to the network storage N and the F file written, and finally the file F of the existing network storage may be deleted. When moving is finished, the process continues on returning to 1622. In 1622, when still unsearched files are no longer present, the processing of 1604 of FIG. 16 ends and the overall unify processing also ends.

During execution of the unify processing by the unifying means (module) 160 the file access process and the add process, delete process and leveling processes of the mover means are stopped by the processor (request processing means). When the unifying process ends and the client 1 issues a file access command to the virtualizing device instead of the existing network storage unit, the virtualizing device 3 issues an access request to the destination storage network for file F to be accessed and then accesses the file. Therefore as seen from the client, there is no difference between accessing the existing storage network unit, and accessing the virtualizing network storage system with unified existing network storage units except that in the latter case there is more capacity (available disk size).

Figure 19:
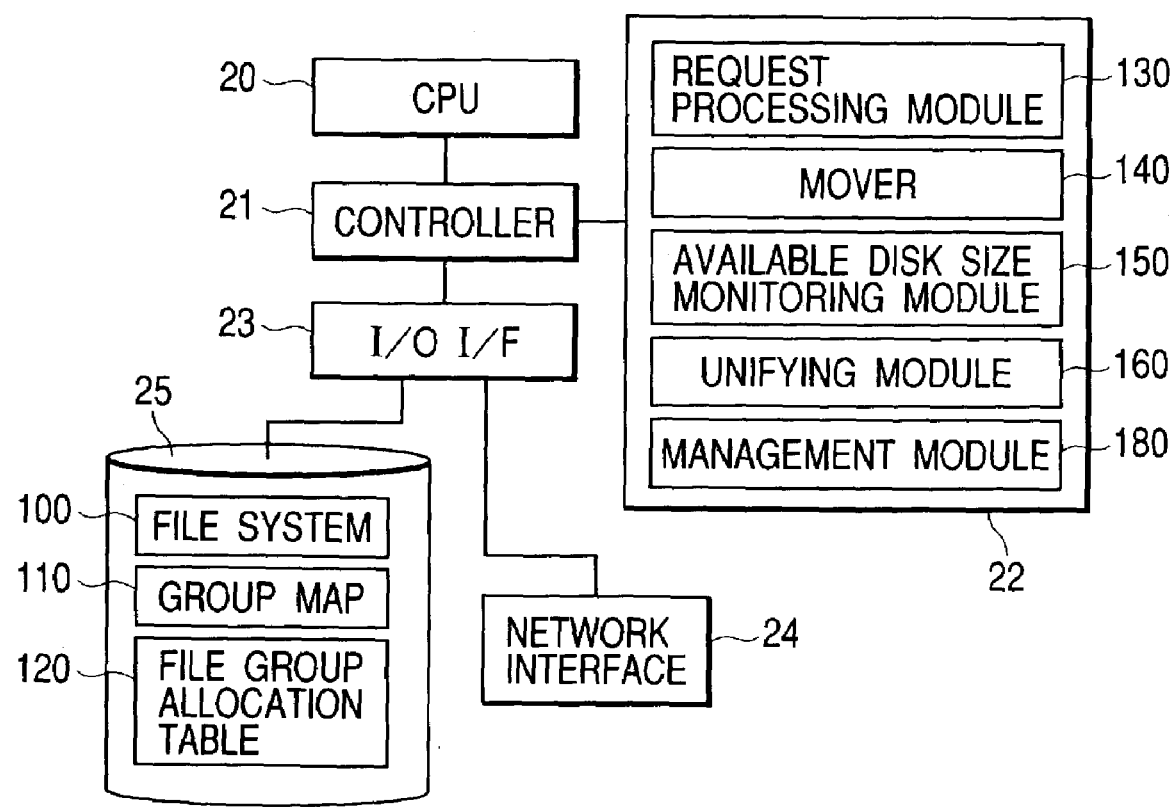
FIG. 19 is a drawing of the computer system incorporating the virtualizing method of the present invention.

Each element comprising the virtualizing device 3 has now been described. An example of a virtualizing device containing each of these elements is shown in FIG. 19. Hardware constituted by a workstation or a personal computer or a server is comprised of a CPU 20, a controller 21, a memory 22, an I/O interface 23, a network interface 24 and a disk device 25 and incorporates a previously described UNIX type operating system for example LINUX. The file system 100, the group map 110 and the file group allocation table 120 are respectively stored as data in the disk device 25. The request processing (means) module 130, the mover (means) module 140, the available disk size monitoring module 150, a unifying (means) module 160, and a management (means) module 180 are respectively stored as program codes in a memory 22 and are implemented by the CPU 20 as functions of the virtualizing device.

Second Embodiment

Figure 20:
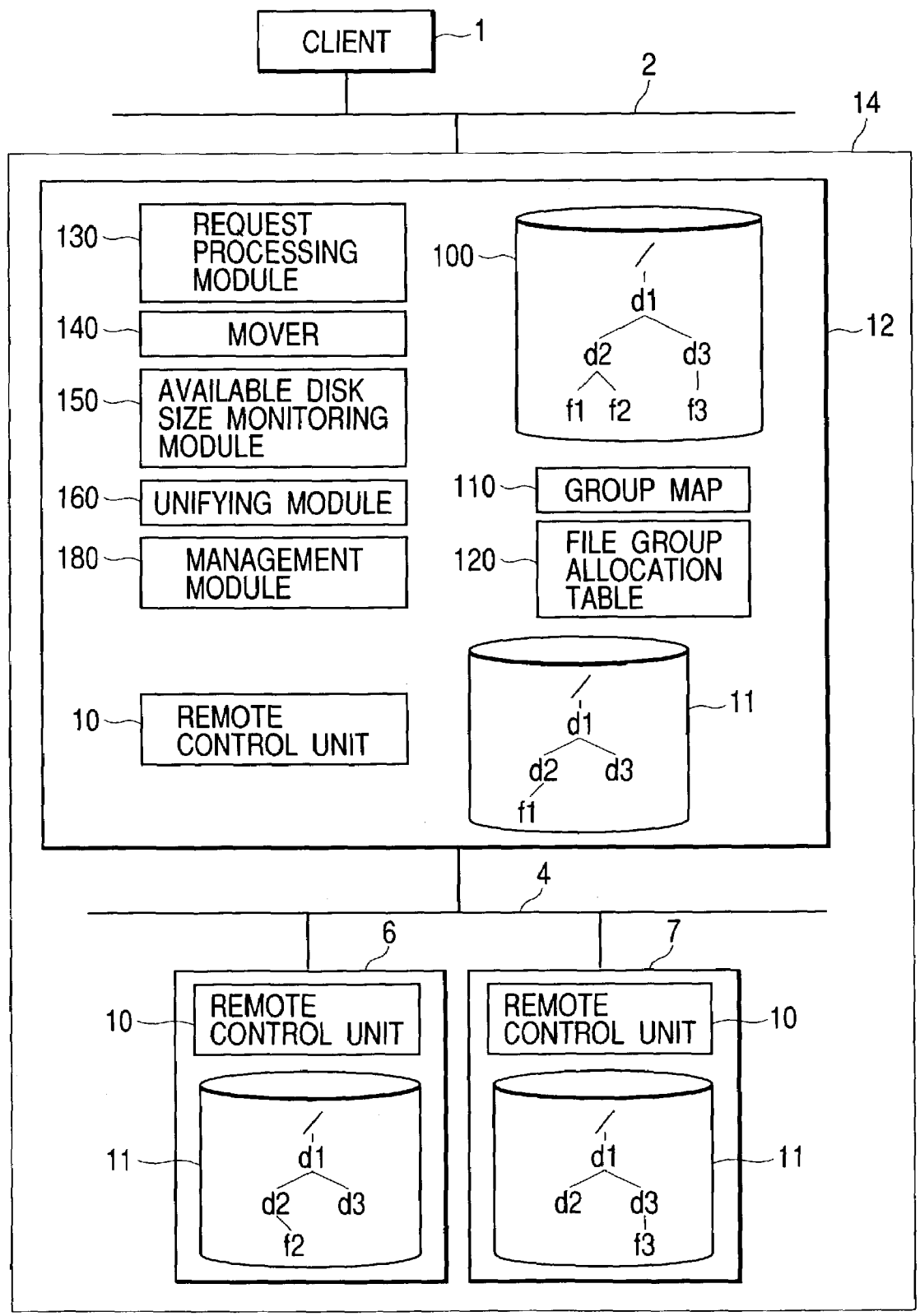
FIG. 20 is a block diagram showing a structural view of the virtualizing device comprising a network storage function.

FIG. 20 is a diagram showing the overall structure of the information system containing the second embodiment of the present invention. This embodiment is a variation (adaptation) of the first embodiment of FIG. 1 so the points differing from the first embodiment are described. The reference numeral 14 denotes a virtualizing network storage system having functions equivalent to the unified virtualizing network storage system 8 of FIG. 1. The network 4 and the one or more network storage units 6, 7 of reference numeral 14 are identical to the unified virtualizing network storage system 8 of FIG. 1, the differing point is the virtualizing device 12. In the virtualizing device 12 of the present embodiment, the file system 100, the group map 110, the file group allocation table 120, the processor (request processing means) 130, a mover (movement means) 140, an available disk size monitoring module 150, a unifying module 160 and a management module 180 are identical to the virtualizing device 3 of the first embodiment and have network storage units 5, 6, 7 comprised of the same remote control unit 10 and a storage device 11 comprising the file system. The second embodiment differs in that the virtualizing device has a network storage function that allows network storage. The virtualizing device 3 (first embodiment) cannot by itself comprised a virtualizing network storage system and must always make a connection to other network storage units. The virtualizing device with network storage function of the present embodiment however, can by itself comprise a virtualizing network storage system and therefore provide a virtualizing network storage system at a lower cost. However, since the second embodiment, contains network storage, the virtualizing device 12 must also access the file itself as well as the management data. The load on the CPU 20 therefore is prone to become high. In other words, the first embodiment has the advantage of offering higher performance.

In the present (second) embodiment, the virtualizing device 12 functioning as a network storage device is registered in the file group allocation table 120 as a storage destination for the designated file group. When the client 1 issues a file access request, the processor (request processing means) 130 receives that request and finds a destination network storage unit for the file to be accessed, and the file access request is issued to the destination network storage unit and the file accessed in processing identical to the first embodiment. However, the virtualizing device of the present embodiment also functions as a network storage device and when the destination network storage unit is the virtualizing device 12, the processor (request processing means) 130 issues a file access request to its own remote control unit 10. The remote control unit 10 receives the request from the processor 130 and accesses the file in the storage device 11.

In the virtualizing device 12 with the network storage function in the present embodiment, the storage device 11 is partitioned into two sections. One section holds the file system 100 and is used as a file management system. The other section also contains a file system and may also be used to store the file itself.

Third Embodiment

Figure 21:
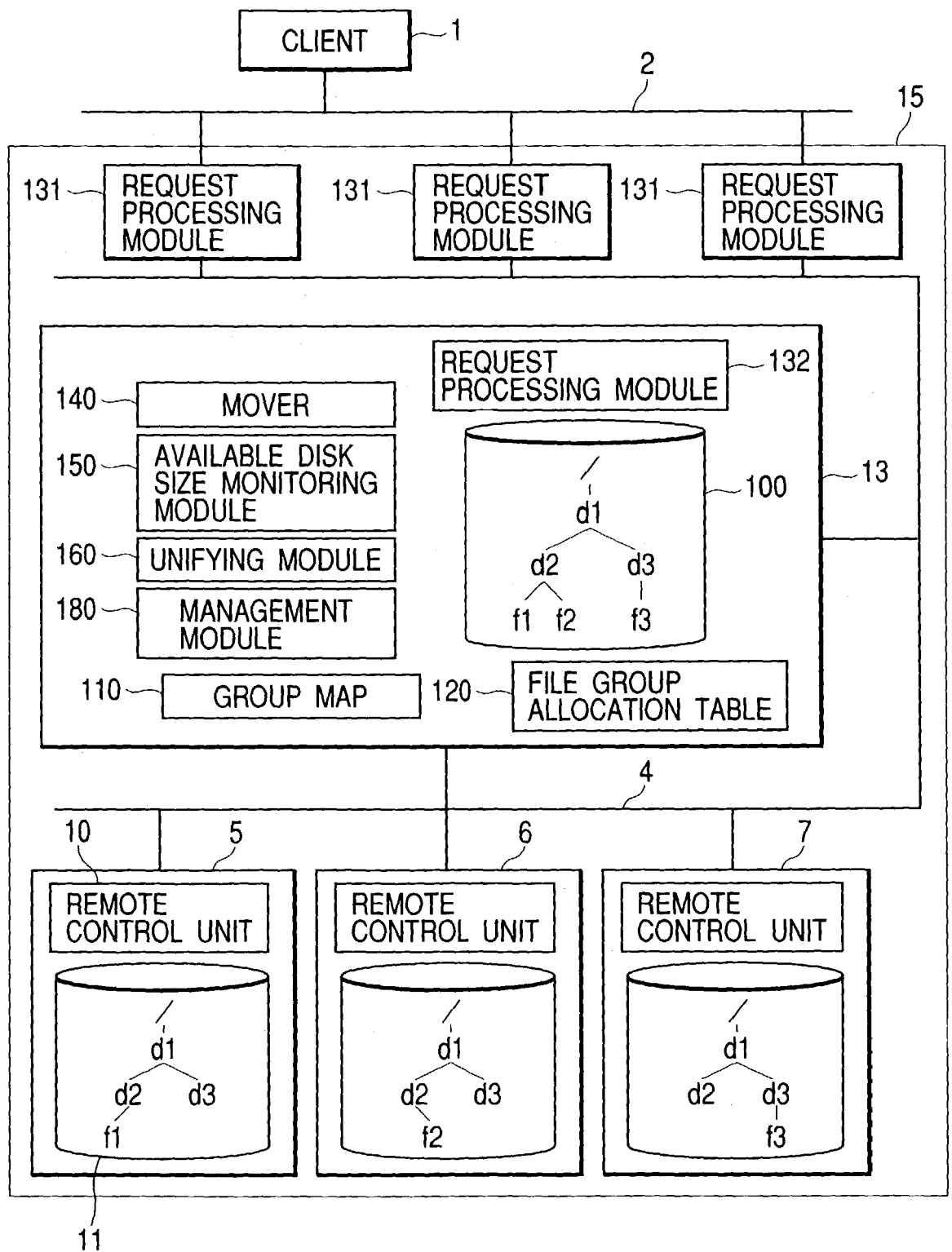
FIG. 21 is a block diagram showing the virtualizing network storage system comprising multiple request processing (means) modules.

FIG. 21 is a block diagram showing the overall structure of the information system of the third embodiment of the present invention. This embodiment is a variation of the first embodiment so the sections differing from the first embodiment are described. First of all, the processor 130 within the virtualizing device 3 (first embodiment) has been slightly changed to a virtualizing device 13. An existing operating system for example LINUX is loaded in the hardware of the known art such as a server, a workstation or a personal computer and the request processing module 131 is mounted within. The request processing module 131 accesses the file by using NFS (Network File System) protocol and the client 1. The client 1 issues a file access request to any of multiple request processing module 131. The request processing module 131 does not hold management information such as the file system 100 inside itself. Instead, when the client 1 issues a file access request, the request processing module 132 of the virtualizing device 13 is accessed and the destination network storage unit of the file for accessing is found. The file access request is issued to the destination network storage unit that was found and the file is accessed. When file accessing ends, the request processing module 131 returns the results of the file access request obtained from the network storage unit, to the requesting client 1. In processing with NFS procedures, instead of accessing its own file system, the group map and file group allocation table, the request processing module 132 of the virtualizing device 3 are accessed over the network as previously described, and the file system 100, the group map 110 and the file group allocation table 120 accessed and the desired data acquired. Otherwise the processing is the same as described for the first embodiment. The request processing module 132 of the virtualizing device 3 receives the request for accessing the management information from request processing module 131, and refers to and rewrites the file system 100, the group map 110, and the file group allocation table 120. The processing of each means of the virtualizing device 13 is the same as in the first embodiment.

In the third embodiment, the request processing modules 131 receiving the file access request from the client 1 are made separate from the virtualizing device 13 and by also establishing multiple request processing modules 131 a large number of requests from clients can be answered compared to the first embodiment. The present embodiment in other words is preferable to use in environments requiring high performance. When multiple request processing modules are utilized, it may appear as viewed by the client that there are multiple entry points to the virtualizing network storage system of the present invention. In such cases, load dispersion devices of the technology of the known art may be installed prior to the multiple request processing modules 131 so that the entry points are unified.

According to the systems disclosed in this specification, the destination network storage unit in which a file is stored is managed as, or depends on, the file group to which the file belongs. In a file map provided as a fixed means for finding the file groups that a file belongs to, the relation between the file group and those destination network storage units are managed by file group allocation. This group map is changed when altering the structure by adding or deleting network storage units. In this kind of management method that manages the files in groups, the management information is small compared to the method of the related art that holds information on separate files in destination network storage units and another effect is that the network storage capacity is effectively used.

Also, when changing the structure of the virtualizing network storage system of the invention, the destination network storage units of the file are moved as file groups. In this case, only the destination network storage unit for the file group whose group allocation has been changed are moved so the process overhead is smaller than when managing destination storage information as individual files.

What is claimed is:

1. A method for virtualizing a plurality of network storages connected to a network into a virtualized network storage system which can be accessed from a client as a single network storage, the method comprising steps of:

predetermining a group map function which correlates a file to only one file group based on a hash function of a file identifier of the file by using a file inode number I as a search key and a hash value given by the hash function G=Hash (I) which constitutes a file group identifier G;

performing said group map function for at least said file;

creating a file group allocation table which records mutual correlation between each of a plurality of file groups and a destination network storage to store files belonging to a corresponding one of the file groups according to said group map function;

storing each of the grouped files into said destination network storage, respectively;

when a new network storage to become a new destination network storage is being added to said virtualized network storage system, issuing an available remaining capacity acquisition request to each existing destination network storage;

identifying a destination network storage which has a smallest available remaining capacity among the existing destination network storages;

moving files belonging to only one of file groups maintained in the identified destination network storage to said new network storage; and repeating the steps of issuing, identifying and moving until a difference between an available remaining capacity of said new network storage and said smallest available remaining capacity becomes lower than a threshold.

2. A method for virtualizing a plurality of network storages connected to a network into a virtualized network storage system which can be accessed from a client as a single network storage, the method comprising steps of:

predetermining a group map function which correlates a file to only one file group based on a hash function of a file identifier of the file by using a file inode number I as a search key and a hash value given by the hash function G=Hash (I) which constitutes a file group identifier G;

performing said group map function for at least said file;

creating a file group allocation table which records mutual correlation between each of a plurality of file groups and a destination network storage to store files belonging to a corresponding one of the file groups according to said group map function;

storing each of the grouped files into said destination network storage, respectively;

periodically issuing an available remaining capacity acquisition request to each destination network storage;

when the available remaining capacity of a first destination network storage in said virtualized network storage system drops below a first threshold value, selecting only one file group from among file groups stored in said first destination network storage and said file group as a file group to be moved;

selecting a second destination network storage other than said first destination network storage as a movement destination network storage;

moving files of the selected file group to the second destination network storage;

updating an old mutual correlation between the selected file group and the first destination network storage into a new correlation between the selected file group and the second destination network storage in said file group allocation table; and repeating the steps of selecting, moving and updating until the remaining available capacity of the first destination network storage exceeds a second threshold value.

3. A method according to claim 2, wherein said second destination network storage has the largest remaining available capacity in said virtualized network storage system.

4. A method according to claim 2, wherein the second threshold value is bigger than the first threshold value.

5. A method for virtualizing a plurality of network storages connected to a network into a virtualized network storage system which can be accessed from a client as a single network storage, the method comprising steps of:

predetermining a group map function which correlates a file to only one file group based on a hash function of a file identifier of the file by using a file inode number I as a search key and a hash value given by the hash function G=Hash (I) which constitutes a file group identifier G;

performing said group map function for at least said file;

creating a file group allocation table which records mutual correlation between each of a plurality of file groups and a destination network storage to store files belonging to a corresponding one of the file groups according to said group map function;

storing each of the grouped files into said destination network storage, respectively;

periodically issuing an available remaining capacity acquisition request to each destination network storage;

when a differential between a maximum available remaining capacity among respective available remaining capacities in respective destination network storages and a minimum available remaining capacity in a first destination network storage of said virtualized network storage system exceeds a first threshold value, selecting only one file group from among file groups stored in said first destination network storage;

selecting a second destination network storage other than said first destination network storage as a movement destination network storage;

moving files of the selected file group to the second destination network storage;

updating an old mutual correlation between the selected file group and the first destination network storage into a new correlation between the selected file group and the second destination network storage in said file group allocation table; and repeating the steps of selecting, moving and updating until the differential of the remaining available capacities of said first destination network storage drops below a second threshold value.

6. A method according to claim 5, wherein said second destination network storage has the largest remaining available capacity in said virtualized network storage system.

7. A method according to claim 5, wherein the second threshold value is smaller than the first threshold value.

* * * * *

UNITED STATES PATENT AND TRADEMARK OFFICE
CERTIFICATE OF CORRECTION

PATENT NO. : 7,606,871 B2
APPLICATION NO. : 10/335853
DATED : October 20, 2009
INVENTOR(S) : Kawamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twelfth Day of October, 2010

David J. Kappos
*Director of the United States Patent and Trademark Office*